US007580007B2

United States Patent
Brown et al.

(10) Patent No.: US 7,580,007 B2
(45) Date of Patent: Aug. 25, 2009

(54) APPARATUS AND METHOD FOR BI-DIRECTIONALLY SWEEPING AN IMAGE BEAM IN THE VERTICAL DIMENSION AND RELATED APPARATI AND METHODS

(75) Inventors: Margaret Brown, Seattle, WA (US); Mark Freeman, Snohomish, WA (US); John R. Lewis, Bellevue, WA (US); Jim Bovee, Seattle, WA (US); Randy Sprague, Carnation, WA (US)

(73) Assignee: Microvision, Inc., Redmond, WA (US)

( * ) Notice: Subject to any disclaimer, the term of this patent is extended or adjusted under 35 U.S.C. 154(b) by 1252 days.

(21) Appl. No.: 10/441,916

(22) Filed: May 19, 2003

(65) Prior Publication Data
US 2004/0004585 A1    Jan. 8, 2004

Related U.S. Application Data

(60) Provisional application No. 60/381,569, filed on May 17, 2002.

(51) Int. Cl.
*G09G 1/08* (2006.01)
(52) U.S. Cl. ....................................................... 345/15
(58) Field of Classification Search .................... 345/15, 345/213; 359/199, 236, 237
See application file for complete search history.

(56) References Cited

U.S. PATENT DOCUMENTS 2,543,066 A    2/1951  Salinger

| 3,471,641 | A |   | 10/1969 | Baker et al. |
| 4,975,691 | A | * | 12/1990 | Lee .............................. 345/79 |
| 5,216,236 | A |   | 6/1993 | Blais |
| 5,659,327 | A | * | 8/1997 | Furness et al. ................. 345/8 |
| 5,936,764 | A | * | 8/1999 | Kobayashi .................. 359/385 |
| 5,955,724 | A |   | 9/1999 | Livingston |
| 6,038,051 | A |   | 3/2000 | Suzuki et al. |

(Continued)

FOREIGN PATENT DOCUMENTS

KR    1020000073553    12/2000

OTHER PUBLICATIONS

International Search Report for PCT/US03/15860 dated Oct. 8, 2003.

*Primary Examiner*—Regina Liang
*Assistant Examiner*—Shaheda A Abdin
(74) *Attorney, Agent, or Firm*—Kevin D. Wills

(57) ABSTRACT

A scan assembly of an image generator sweeps an image beam in a first dimension at a first rate and bi-directionally in a second dimension at a slower rate. Sweeping the beam bi-directionally in the vertical dimension (generally the dimension of the lower sweep rate) can reduce the scanning power by eliminating the flyback period, and, where the scan assembly includes a mechanical reflector, can reduce the error in the beam position without a feedback loop by reducing the number of harmonics in the vertical sweep function. Furthermore, because the image beam is "on" longer due to the elimination of the flyback period, the scanned image is often brighter for a given beam intensity. The scan assembly may also sweep the image beam non-linearly in the vertical dimension, and this sweep may be bi-directional or uni-directional. Sweeping the beam non-linearly can also reduce the error in the beam position by reducing the number of harmonics in the vertical sweep function.

21 Claims, 16 Drawing Sheets

U.S. PATENT DOCUMENTS

| | | | |
|---|---|---|---|
| 6,140,979 A * | 10/2000 | Gerhard et al. | 345/7 |
| 6,204,829 B1 * | 3/2001 | Tidwell | 345/7 |
| 2001/0024326 A1 | 9/2001 | Nakamura et al. | |
| 2001/0034077 A1 | 10/2001 | Wine et al. | |
| 2002/0163701 A1 | 11/2002 | Plesko | |
| 2002/0163702 A1 | 11/2002 | Hori et al. | |

* cited by examiner

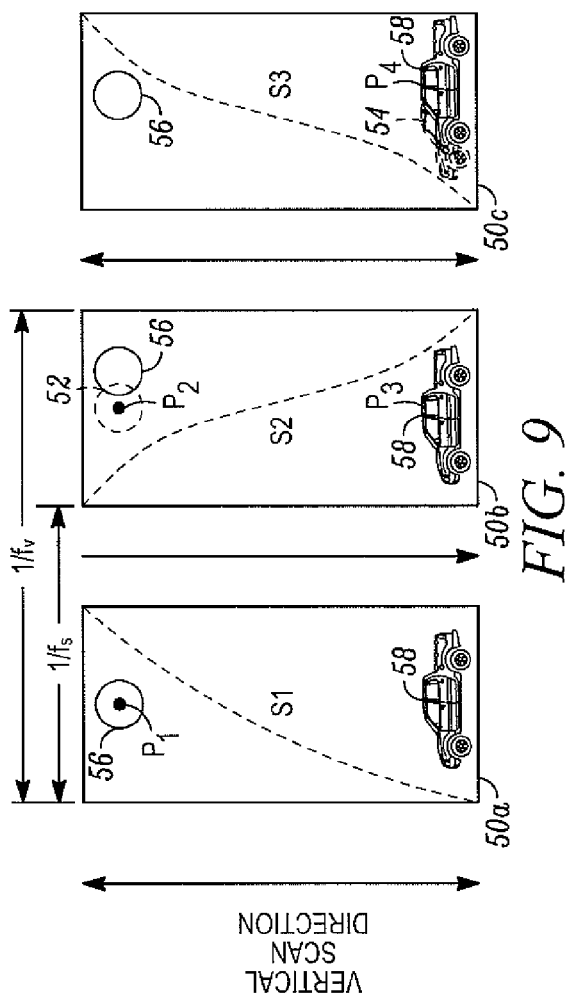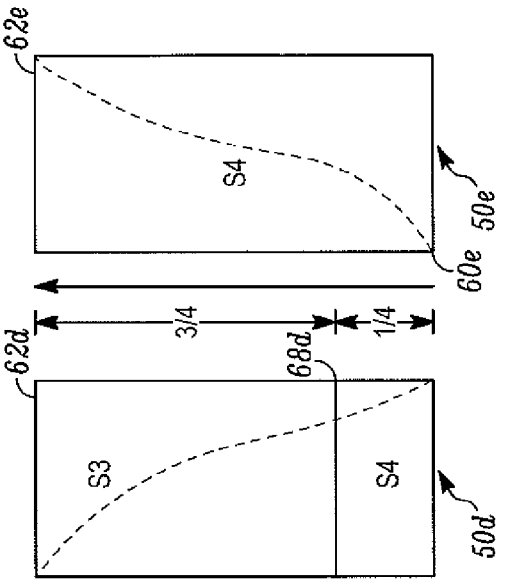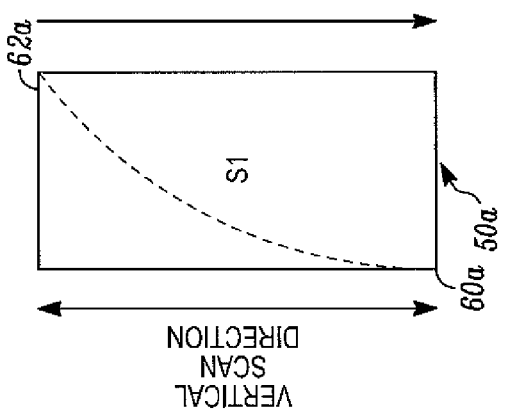
FIG. 9
FIG. 10

APPARATUS AND METHOD FOR BI-DIRECTIONALLY SWEEPING AN IMAGE BEAM IN THE VERTICAL DIMENSION AND RELATED APPARATI AND METHODS

CLAIM OF PRIORITY

This application claims priority to U.S. Provisional Application Ser. No. 60/381,569, filed on May 17, 2002, which is incorporated by reference.

BACKGROUND

An electronic image generator, such as television set, scans a viewable image, or a sequence of viewable video images, onto a display screen by electronically sweeping an electromagnetic image beam across the screen. For example, in a television set, the image beam is a beam of electrons, and a coil generates a linearly increasing magnetic field or electric field to sweep the beam.

An optical image generator is similar except that it scans a viewable image onto a display screen by mechanically sweeping an electromagnetic image beam across the screen. Or, in the case of a Virtual Retinal Display (VRD), the optical image generator scans a viewable directly onto a viewer's retina(s).

FIG. 1 is a view of a conventional optical image-display system 10, which includes an optical image generator 12 and a display screen 14. The image generator 12 includes a beam generator 16 for generating an optical beam 18, and includes a scan assembly 20 for scanning an image onto the screen 14 with the beam. Where the system 10 is a VRD, the scan assembly 20 scans the image directly onto a viewer's retina(s) (not shown). The scan assembly 20 includes a reflector 22, which simultaneously rotates back and forth in the horizontal (X) and vertical (Y) dimensions about pivot arms 24a and 24b and pivot arms 26a and 26b; respectively. By rotating back and forth, the reflector 22 sweeps the beam 18 in a two-dimensional (X-Y) raster pattern to generate the image on the screen 14 (or retina(s)). The scan assembly 20 includes other components and circuitry (not shown) for rotating the reflector 22 and monitoring its instantaneous rotational position, which is proportional to the instantaneous location at which the beam 18 strikes the screen 14. In an alternative implementation that is not shown, the scan assembly 20 may include two reflectors, one for sweeping the beam 18 in the horizontal (X) dimension and the other for sweeping the beam in the vertical (Y) dimension. An optical image-display system that is similar to the system 10 is disclosed in U.S. Pat. No. 6,140,979 of Gerhard, et al., entitled SCANNED DISPLAY WITH PINCH, TIMING, AND DISTORTION CORRECTION and U.S. Pat. No. 5,467,104 of Furness, et al., entitled VIRTUAL RETINAL DISPLAY, each of which is incorporated by reference.

Referring to FIGS. 1-3, the operation of the optical image-display system 10 is discussed.

Referring to FIG. 1, the image generator 12 starts scanning an image at an initial pixel location X=0, Y=0 and stops scanning the image at an end pixel location X=n, Y=m, where n is the number of pixels in the horizontal (X) dimension of the image and m is the number of pixels in the vertical (Y) dimension of the image. Specifically, the beam generator 16 modulates the intensity of the image beam 18 to form a first pixel $Z_{0,0}$ of the scanned image when the reflector 22 directs the beam onto the location X=0, Y=0. As the reflector 22 sweeps the beam 18 toward the location X=n, Y=m, the generator 16 periodically modulates the intensity of the beam to sequentially form the remaining pixels of the image including the last pixel $Z_{n,m}$. Then, the image generator 12 starts scanning the next image at the location X=0, Y=0, and repeats this procedure for all subsequent images.

Referring to FIG. 2, during the scanning of the image, the reflector 22 sinusoidally sweeps the beam 18 bi-directionally in the horizontal (X) dimension at a horizontal sweep frequency $f_h = 1/t_h$, where $t_h$ is the period of the horizontal sinusoid. FIG. 2 is a plot of this horizontal sinusoid, which indicates the position of the beam 18 in the horizontal (X) dimension versus time, where + corresponds to the right side of the screen 14 and − corresponds to the left side. As this plot shows, the reflector 22 oscillates in a sinusoidal manner about the pivot arms 24a and 24b at $f_h$, and thus sinusoidally sweeps the beam 18 from side to side of the screen 14 at the same frequency. The horizontal sweep is bi-directional because the beam 18 is "on", and thus generates pixels, in both the left-to-right (+X) and right-to-left (−X) horizontal directions. Although not required, $f_h$ may substantially equal the resonant frequency of the reflector 22 about the arms 24a and 24b. One advantage of designing the reflector 22 such that it resonates at $f_h$ is that the scan assembly 20 can drive the reflector in the horizontal (X) dimension with relatively little power.

Referring to FIG. 3, the reflector 22 also linearly sweeps the beam 18 uni-directionally in the vertical (Y) dimension at a vertical sweep frequency $f_v = 1/t_v$, where $t_v$ is the period of the vertical saw-tooth wave. FIG. 3 is a plot of this saw-tooth wave, which indicates the position of the beam 18 in the vertical (Y) dimension versus time, where + corresponds to the bottom of the screen 14 and − corresponds to the top. As this plot shows, during a vertical scan period V, the scan assembly 20 linearly rotates the reflector 22 about the pivot arms 26a and 26b from a top position to a bottom position, thus causing the reflector to sweep the beam 18 from the top pixel $Z_{0,0}$ of the screen 14 to the bottom (pixel $Z_{n,m}$) of the screen (−Y direction). During a fly-back period FB, the scan assembly 20 quickly (as compared to the scan period V) rotates the reflector 22 back to its top position ($Z_{0,0}$) to begin the scanning of a new image. Consequently, $t_v = V + FB$ such that the vertical sweep frequency $f_v = 1/(V+FB)$. Moreover, the vertical sweep is unidirectional because the beam 18 is "on" only during the scan period V while the reflector 22 sweeps the beam from top ($Z_{0,0}$) to bottom ($Z_{n,m}$) (−Y direction), and is off during the flyback period FB when the reflector 22 returns to its top position ($Z_{0,0}$). One advantage of vertically sweeping the beam linearly and uni-directionally is that this is compatible with conventional video equipment that generates video images for display using this same vertical sweeping technique.

Unfortunately, uni-directionally sweeping the beam 18 in the vertical (Y) dimension may increase the cost, complexity, size, and power consumption of the system 10. Referring to FIG. 3, the vertical-sweep saw-tooth wave includes many harmonics of the fundamental vertical sweep frequency $f_v$. For example, if $f_v = 60$ Hz, then the saw-tooth wave has significant harmonics up to approximately 3600 Hz (the $60^{th}$ harmonic, i.e., $60 \times f_v$). The vibrations that these higher harmonics introduce to the reflector 22 may cause a significant error in the vertical (Y) location of the beam 18. That is, the reflector 22 may not rotate smoothly through the vertical scan, producing a vertical "jitter" or "ripple" that may cause the location where the beam 18 strikes the screen 14 to be misaligned with the location of the pixel Z that the beam is currently forming. One way to reduce or eliminate this error is to include a feedback loop (not shown in FIG. 1) in the scan assembly 20 to smoothen the rotation of the reflector 22 during the vertical scan period V. Such a feedback loop is disclosed in U.S. Pat. No. 6,140,979, which is incorporated by reference. Unfortunately, such a feedback loop often includes complex circuitry that can occupy significant layout area, and, thus, may increase the complexity, size, and cost of the image generator 12. Furthermore, quickly rotating the reflector 22 from its bottom position ($Z_{n,m}$) to its top position ($Z_{0,0}$) during the flyback period FB often requires that the scan assembly 20 drive the electromagnets (not shown) that rotate the reflector 22 with a significant peak current. Unfortunately, this may increase the power consumed by the image generator 12 and the size of the scan assembly's current-driver circuit (not shown), and thus may further increase the cost of the image generator.

Another way to reduce or eliminate the ripple error is to generate a drive signal that offsets the non-linearity of the vertical scan. A variety of approaches can be applied to reduce the ripple.

In one such approach, a feedback loop in the scan assembly 20 compares the detected angular position about the vertical axis with an idealized waveform. The loop then generates a drive signal to minimize the error, according to conventional feedback control approaches and smoothen the rotation of the reflector 22 during the vertical scan period V.

In another approach, a general analytical or empirical model of the vertical scan assembly is developed for the general characteristics of the scan assembly 20, using parameters of the a set of scan assemblies. Then, for the specific scan assembly 20 in use, the individual response is characterized during manufacture or at system start-up to refine the model parameters more precisely and the data representing the particular scan assembly 20 are stored in memory. The scan assembly then generates a drive signal according to the stored model to minimize the ripple.

In some cases, such feedback loops and adaptive control systems may include complex circuitry that occupies significant layout area or require specialized components, and thus may increase the complexity, size, and cost of the image generator 12.

SUMMARY

According to an embodiment of the invention, a scan assembly sweeps an image beam in a first dimension at a first frequency and bi-directionally in a second dimension at a second frequency that is less than the first frequency.

For example, sweeping the beam bi-directionally in the vertical dimension can reduce the scanning power by eliminating the flyback period, and can reduce error in the beam position without a feedback loop by reducing the number of harmonics in the vertical sweep function. Furthermore, because the image beam is "on" longer due to the elimination of the flyback period, the scanned image is often brighter for a given beam intensity, thus allowing one to proportionally reduce the intensity, and thus the power, of the image beam for a given image brightness.

According to another embodiment of the invention, a scan assembly sweeps an image beam in the first dimension and non-linearly in the second dimension.

For example, sweeping the beam non-linearly in the vertical dimension can also reduce the error in the beam position by reducing the number of harmonics in the vertical sweep function.

BRIEF DESCRIPTION OF THE DRAWINGS

FIG. 9 is a sequence of video images that are bi-sinusoidally scanned in a manner that causes a viewer to perceive false ghost objects.

FIG. 10 is a sequence of video images that are bi-sinusoidally scanned in a manner that reduces or eliminates a viewer's perception of false ghost objects according to an embodiment of the invention.

DETAILED DESCRIPTION

Bi-Sinusoidal Scanning Pattern

Referring to FIGS. 4-8, one general embodiment according to the invention is a scan assembly, similar to the scan assembly 20 (FIG. 11), that bi-directionally sweeps the image beam in the vertical (Y) dimension. That is, the image beam is "on" while the scan assembly sweeps the beam from the top to the bottom of the screen, and is also "on" while the scan assembly sweeps the beam from the bottom back to the top of the screen.

Still referring to FIGS. 4-8, in one embodiment the scan assembly sweeps an image beam sinusoidally and bi-directionally in both the horizontal (X) and vertical (Y) dimensions, although one can use a sweeping function other than a sinusoid in either of the horizontal and vertical dimensions as discussed below in conjunction with FIG. 12. For clarity, "bi-sinusoidal" is used to denote a sinusoidal and bi-directional sweep of the image beam in both the horizontal (X) and vertical (Y) dimensions. Because both of the horizontal and vertical sweep functions are sinusoids, the resulting two-dimensional scan pattern is a repeated pattern such as a Lissajous pattern. For simplicity of presentation, the term Lissajous pattern will be used herein to refer to patterns that employ sinusoidal motion in about two or more axes.

The following variables represent the parameters used to define a bi-sinusoidal sweep of an image beam according to this embodiment of the invention.

$X(t)$=the horizontal sweep sinusoid as a function of time $Y(t)$=the vertical sweep sinusoid as a function of time $f_h$=horizontal sweep frequency $f_v$=vertical sweep frequency $\phi_h$=initial phase of the horizontal sweep sinusoid (X(t))

$\phi_v$=initial phase of the vertical-sweep sinusoid (Y(t))

$A$=frequency at which the Lissajous scan pattern formed by the horizontal and vertical sweep sinusoids repeats itself $R$=frequency at which images are to be scanned/displayed $N$=number of images to be scanned/displayed during a period $1/A$ $n_h$=number of cycles of the horizontal sweep sinusoid per period $1/A$ $n_v$=number of cycles of the vertical sweep sinusoid per period $1/A$ $p_h$=horizontal resolution of, i.e., number of horizontal pixels in, the source and scanned images $p_v$=vertical resolution of, i.e., number of vertical pixels in, the source and scanned images $\Delta$=maximum width between scan lines in the dimension of the lowest sweep frequency.

And these parameters are defined or related by the following equations. As discussed below, some of these equations are not absolute, but are merely guidelines.

$$X(t)=(p_h/2)\sin(2\pi f_h t+\phi_h) \qquad (1)$$

$$Y(t)=(p_v/2)\sin(2\pi f_v t+\phi_v) \qquad (2)$$

Figure 1:
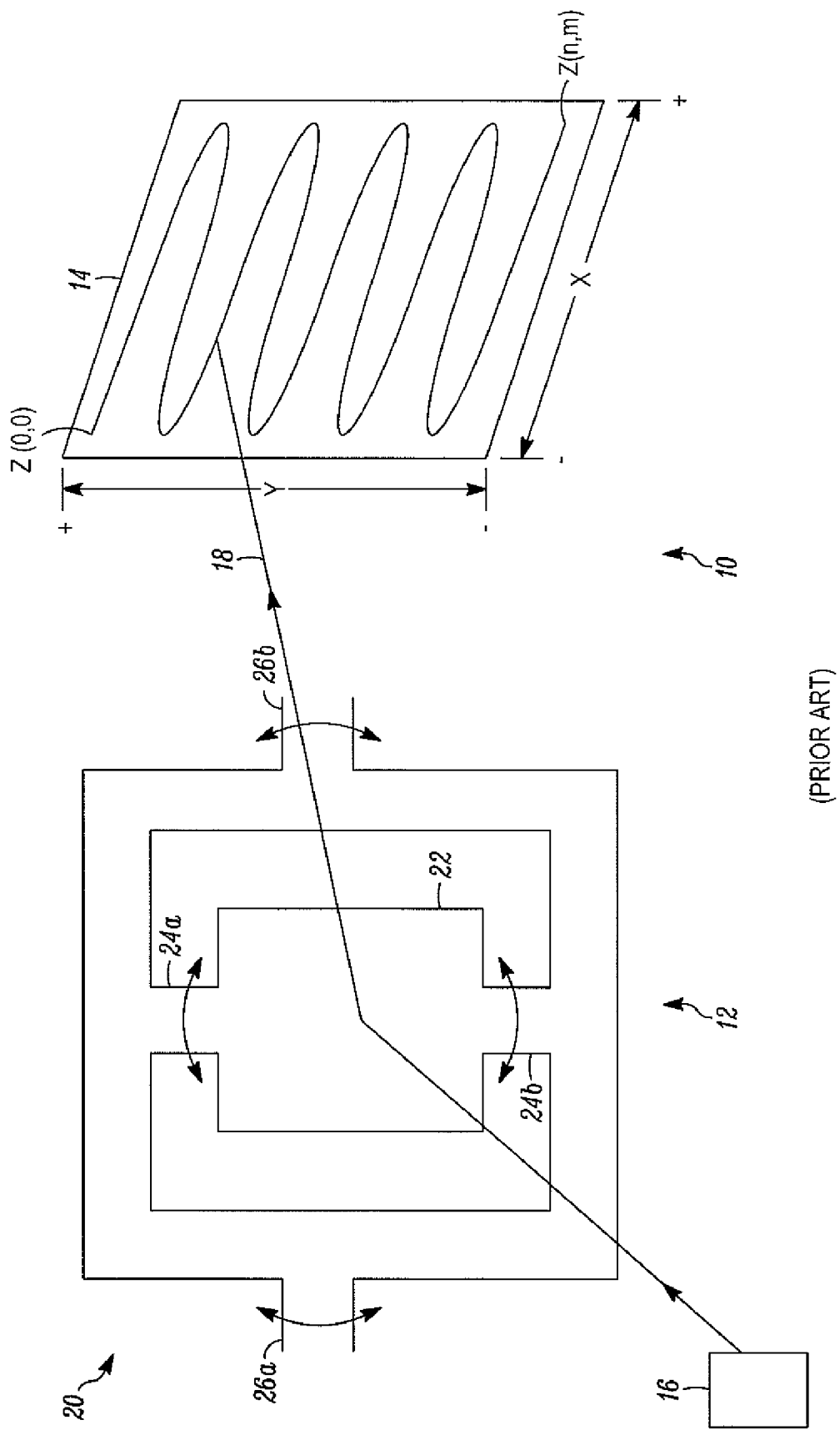
FIG. 1 is a conventional optical image-display system.
Figure 2:
FIG. 2 is a plot of a sinusoid that indicates the position of the image beam of FIG. 1 in the horizontal dimension versus time.
Figure 3:
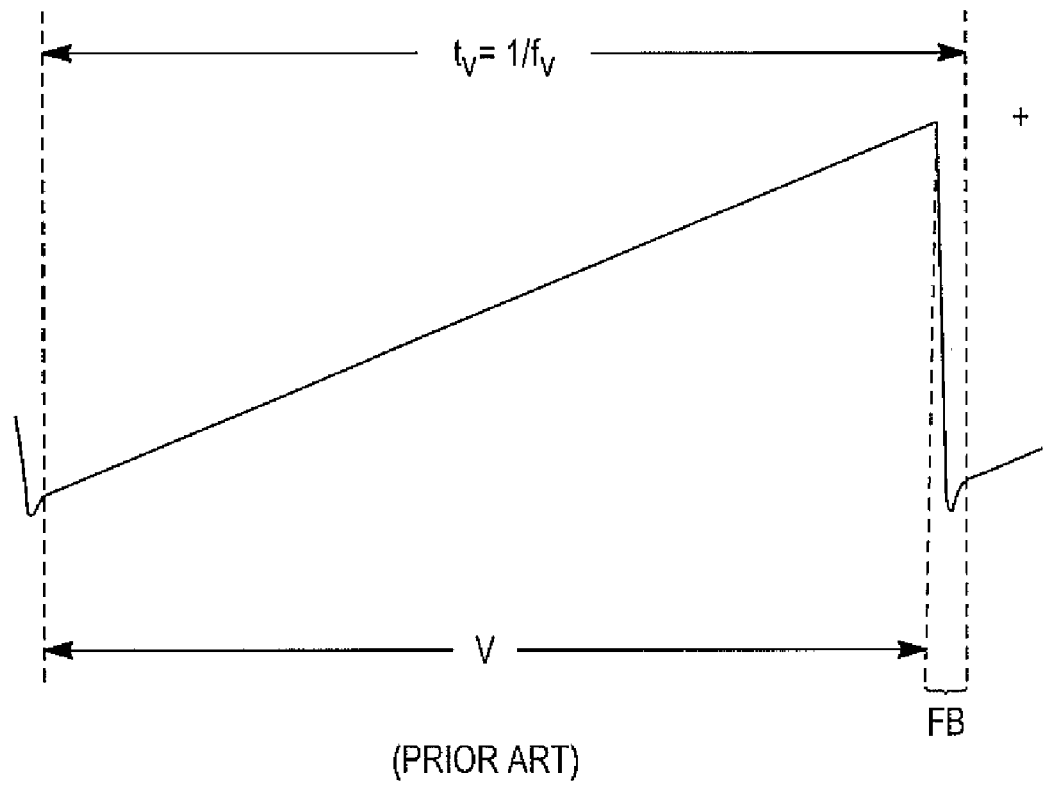
FIG. 3 is a plot of a saw-tooth wave that indicates the position of the image beam of FIG. 1 in the vertical dimension versus time.

For example, if $p_h$=800 and $p_v$=600, X(t) ranges from +400 pixels (400 pixels from the center to the right side of the screen 14 in FIG. 1) to −400 pixels (400 pixels from the center to the left side of the screen), and Y(t) ranges from +300 pixels (300 pixels from the center to the top of the screen) to −300 pixels (300 pixels from the center to the bottom of the screen).

$$N=R/A \qquad (3)$$

For example, if the Lissajous pattern repeats itself at a rate of A=1 Hz, and the images are to be scanned out at a rate of R=5 Hz, then N=5/1=5 images are displayed per each period 1/A during which a complete Lissajous pattern is scanned.

$$f_h=An_h \qquad (4)$$

$$f_v=An_v \qquad (5)$$

For example, if A=1 Hz and it takes $n_h$=9 periods of the horizontal sweep frequency $f_h$ to complete the Lissajous pattern, then $f_h$=1×9=9 Hz. Similarly, if $n_v$=2 periods of the vertical sweep frequency $f_v$ to complete the Lissajous pattern, then $f_v$=1×2=2 Hz. It is preferred, but not required, that $n_h$ and $n_v$ be integers that have no common factor between them other than one. As discussed below in conjunction with FIG. 4, if $n_h$ and $n_v$ do have a common factor other than one, then $f_h$ and $f_v$ are higher than they have to be for a given maximum line width $\Delta$.

Combining equations (4) and (5) yields:

$$f_h/n_h=f_v/n_v=A \qquad (6)$$

Furthermore, assuming that $f_v$ is less than $f_h$, which is typically (but not always) the case, then:

$$\Delta=(\pi p_v A)/2f_h \qquad (7)$$

As discussed below in conjunction with FIGS. 4-8, because most source images assume pixels that are arranged in a grid pattern, a designer of a bi-sinusoidal image generator would be led to select values for the above parameters so that the resulting Lissajous pattern of the scanned image "fits" the grid pattern. For example, source images that are computer generated or that are captured by a conventional video camera or digital camera typically have their pixels arranged in a grid pattern. Although the Lissajous scan pattern may differ significantly from the grid pattern, the quality of the scanned image can approach or equal that of the source image by proper selection of values for the above parameters. Of course if the pixels of the source image are arranged in a Lissajous pattern, then the designer can merely select the parameter values such that the Lissajous scan pattern of the scanned image is the same as the Lissajous pattern of the source image.

Figure 4:
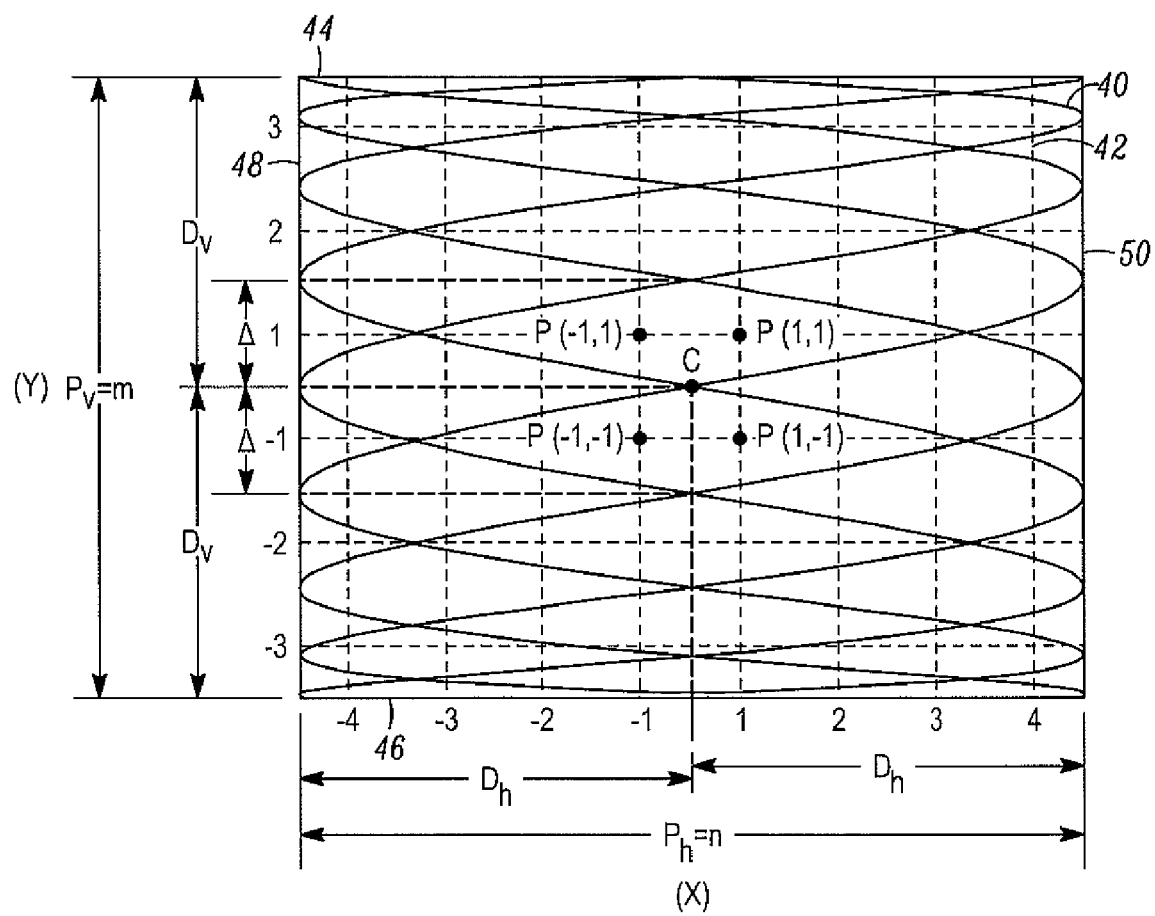
FIG. 4 is a plot of a bi-sinusoidal image-scanning pattern overlaid on a source-image grid pattern according to an embodiment of the invention.

FIG. 4 is a plot of an example of one bi-sinusoidal scanning pattern 40 overlaid on a source-image grid pattern 42 according to an embodiment of the invention. In this example, $p_h$=8, $p_v$=6, $n_h$=9, and $n_v$=2. The bi-sinusoidal scanning pattern 40 represents the path of the image beam as it sweeps horizontally and vertically to scan an image, and thus represents all possible locations of the pixels that compose the scanned image. Conversely, the intersecting points of the grid pattern 42 identify the locations of the pixels $P_{n,m}$ that compose the source image, where n=$P_h$ and m=$P_v$. By convention, where $p_h$ and $p_v$ are even numbers as in this example, the centers C of the scanned and original images are coincident, and are respectively located ±0.5 pixels from $P_{n,-1}$ and $P_{n,1}$ in the vertical (Y) dimension and ±0.5 pixels from $P_{-1,m}$ and $P_{1,m}$ in the horizontal (X) dimension. Consequently, in this example, the respective distances ±$D_v$ from the center C to the tops 44 and the bottoms 46 of the source and scanned images equal $P_v/2$=M/2=±3 pixels, and the respective distances ±Dh to the left 48 and right 50 of the source and scanned images equal $P_h/2$=n/2=±4 pixels. This is consistent m/2 with equations (1) and (2), where the peak amplitude of the vertical sinusoid Y(t) equals $p_v/2$=m/2 6/2=3 pixels, and the peak amplitude of the horizontal sinusoid X(t) equals $p_h/2$=h/2 8/2=4 pixels. Also in this example, it is assumed that an image generator (FIG. 17) includes a scan assembly for driving a reflector, or other beam deflector, bi-sinusoidally in the vertical (Y) dimension as discussed below.

Still referring to FIG. 4, to design an image generator for scanning the pattern 40, a designer first determines the desired maximum line width $\Delta$. As discussed above and as shown in FIG. 4, $\Delta$ is the maximum width in the vertical (Y) dimension between two adjacent horizontal lines of the scan pattern 40. Empirical studies of image quality indicate that $\Delta\lesssim\sim1$ can be a desirable selection. Therefore, setting $\Delta\lesssim1$ to satisfy this guideline, the following expression for $f_h$ is derived from equation (7) above:

$$f_h \geq (\pi p_v A)/2 \qquad (7)$$

Next, the A can be determined. For example, assume that the source images are video images having a display rate of R=30 Hz (30 images per second), and that image generator (FIG. 17) is to scan one image per Lissajous pattern (N=1). Therefore, A=30 Hz per equation (3).

Then, the designer selects $n_v$. For example, assume that the designer wishes $n_v=2$ (two vertical sweep cycles per each Lissajous pattern).

Next, the designer calculates $f_v$ from equation (5). In this example, A=30 Hz and $n_v=2$, giving $f_v=60$ Hz. Although $f_v$ can be any frequency compatible with the scan assembly, it has been empirically determined that, for image quality purposes, ~50 Hz$\leq f_v \leq$~75 Hz or $f_v$>1500 Hz.

Then, the designer calculates the minimum value of $f_h$ from equation (8). In this example where $P_v=6$ and A=30 Hz, $f_h \geq (\pi 6 \times 30)/2 \geq$~282.60 Hz.

Next, the designer preferably chooses the lowest value of $f_h$ that substantially satisfies equation (8) and that yields an integer for $n_h$ that has no common factor with $n_v$ other than one. From equation (6), selecting $f_h$=270 Hz yields $n_h$=9, which has no common integer factor with $n_v$=2. Although $f_h$=270 Hz<282.60 Hz, it yields, per equation (7), a maximum line width Δ=1.05 pixels, which is within 5% of the desired maximum line width of 1 pixel. Therefore, $f_h$=270 Hz substantially satisfies equation (8). Of course, the designer can select a lower value for $f_h$ if it yields a scanned image having an acceptable quality. Alternatively, the designer may select a higher value for $f_h$, such as 330 Hz, which yields $n_h$=11 and Δ<1. But the scan assembly (FIG. 17) typically consumes less power at a lower horizontal frequency $f_h$.

Other embodiments of the above-described design technique are contemplated. For example, the designer may perform the steps of the design procedure in an order that is different than that described above. Furthermore, $n_h$ and $n_v$ may have a common factor other than one. However, this merely results in higher frequencies $f_h$ and $f_v$ with no decrease in the maximum line width Δ. For example, the designer could select $f_h$=540 Hz and $f_v$=120 Hz such that $n_h$=18 and $n_v$=4. But these higher frequencies would merely retrace the Lissajous pattern 40 twice as fast as $f_h$=270 Hz and $f_v$=60 Hz. Therefore, as discussed above, selecting $n_h$ and $n_v$ to have no common non-unity factor typically provides the smallest Δ for the frequencies used. Moreover, one or both of $n_h$ and $n_v$ may be a non-integer. This, however, may cause the Lissajous pattern to begin and end at different points on the display screen from retrace period (1/A) to retrace period, thus causing the pattern to "roll", unless addition processing is applied. Such rolling may adversely affect the quality of the scanned image. In addition, although in the above example $f_h$>>$f_v$, the designer can select $f_v \approx f_h$, $f_v > f_h$, or $f_v$>>$f_h$. Where $f_v$>>$f_h$, the designer should substitute $p_h$ for $p_v$ and $f_v$ for $f_h$ in equation (7), and where $f_v \approx f_h$, the designer should use equation (7) and its vertical equivalent to insure the desired maximum line width Δ in both the horizontal (X) and vertical (Y) dimensions. Furthermore, the horizontal and vertical sweep functions X(t) and Y(t) may be other than sinusoids. An example of a non-sinusoidal function Y(t) is discussed below in conjunction with FIG. 12.

While the above-described rolling may degrade image quality or increase complexity of the data processing, such an approach may be desirable in some cases. For example, in imaging applications or lower-resolution applications, a non-integer ratio can allow greater flexibility in scanner design or can increase addressability, while typically increasing the risk of image artifacts.

Figure 5A:
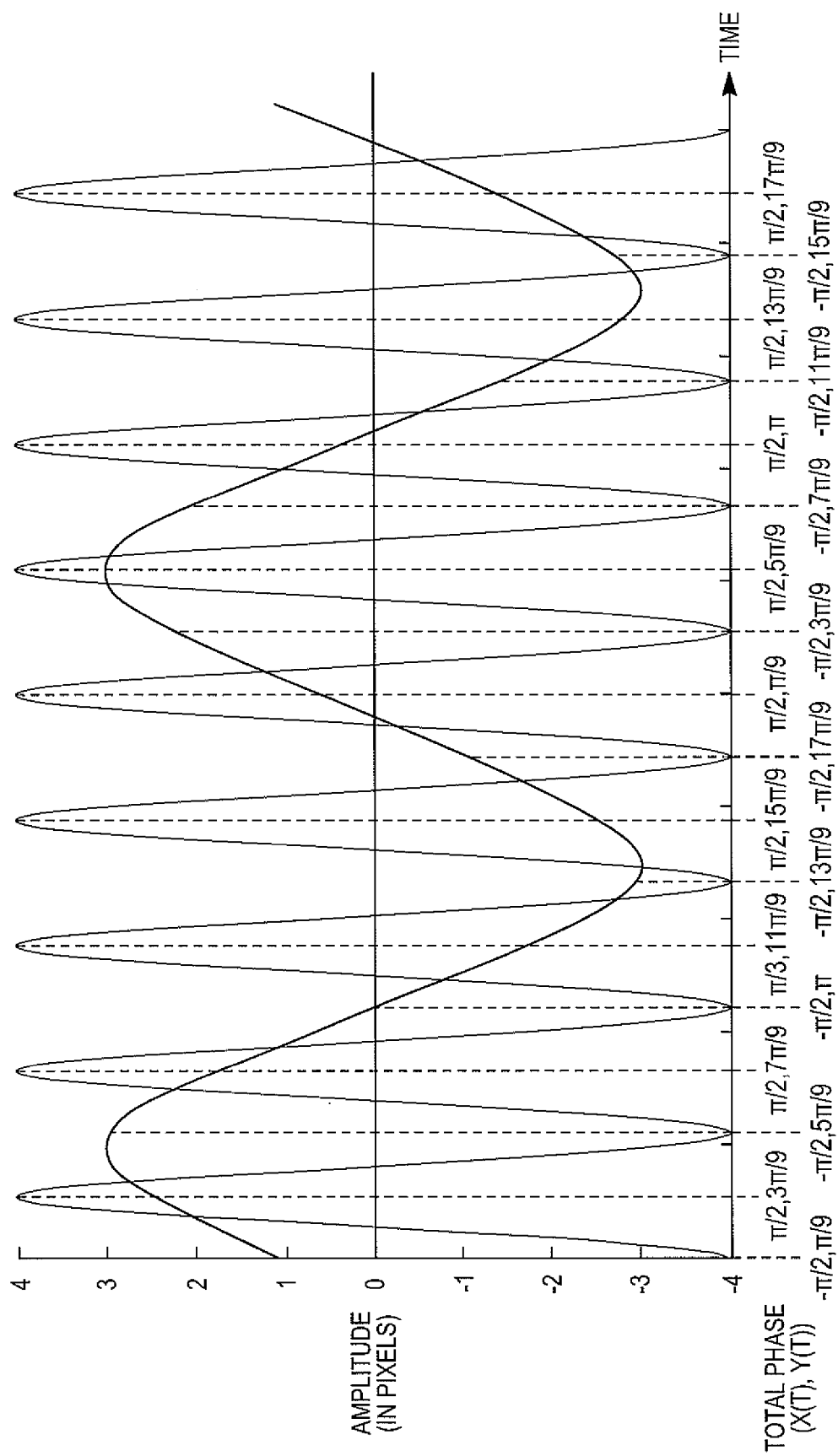
FIG. 5A is a plot of the horizontal and vertical sweeping sinusoids versus time, where the sinusoids have an preferred phase relationship that yields the scanning pattern of FIG. 4 according to an embodiment of the invention.
Figure 5B:
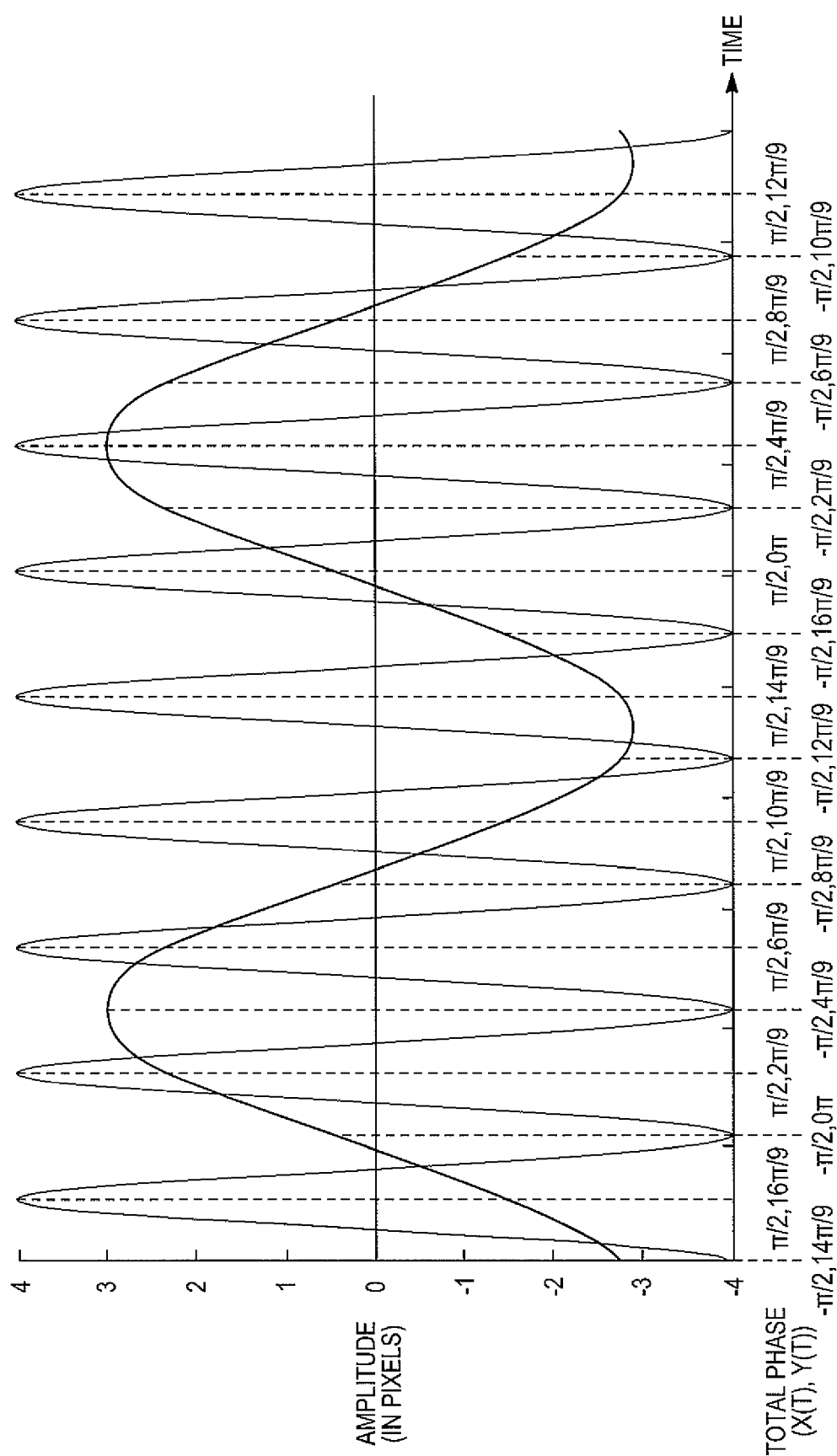
FIG. 5B is a plot of the horizontal and vertical sweeping sinusoids versus time, where the sinusoids have another preferred phase relationship that also yields the scanning pattern of FIG. 4 according to an embodiment of the invention.

Referring to FIGS. 4, 5A, and 5B, the designer next determines a preferred phase relationship between the horizontal sinusoid X(t) and vertical sinusoid Y(t) of equations (1) and (2), that yields the theoretical minimum for the maximum line width Δ calculated according to equation (7). FIG. 5A is a plot of X(t) and Y(t) versus time for one possible preferred phase relationship that yields the Lissajous scan pattern 42 of FIG. 4, and FIG. 5B is a plot of X(t) and Y(t) versus time for another possible preferred phase relationship that yields the pattern 42.

Generally, as discussed below in conjunction with FIGS. 6-8, a preferred phase relationship occurs when there is minimum correlation between the peaks of X(t) and Y(t). Specifically, a preferred phase relationship exists between X(t) and Y(t) when both of the following equations are simultaneously satisfied:

$$2\pi f_v t + \phi_{v0} \text{(the total phase of } Y(t)) = \pm \pi/2 \qquad (9)$$

$$2\pi f_h t + \phi_{h0} \text{(the total phase of } X(t)) = -\pi/2 + (\pi/n_v)[k=\frac{1}{2}]$$
$$\text{for } k=0,1,\ldots (2n_v-1) \qquad (10)$$

As a corollary to equations (9) and (10), a preferred phase relationship also exists between X(t) and Y(t) when both of the following equations are simultaneously satisfied:

$$2\pi f_h t + \phi_{h0} \text{(the total phase of } X(t)) = \pm \pi/2 \qquad (11)$$

$$2\pi f_h t + \phi_{v0} \text{(the total phase of } Y(t)) = -\pi/2 + (\pi/n_h)[k+\frac{1}{2}]$$
$$\text{for } k=0,1,\ldots (2n_h-1) \qquad (12)$$

Because fv≠fh, the instantaneous difference between the total phases of X(t) and Y(t) changes over time. Therefore, equation (10) defines allowable phases of X(t) when the phase of Y(t) has a given value—±π/2 in this example; similarly, equation (12) defines allowable phases of Y(t) when the phase of X(t) has a given value—again ±π/2. One can also derive other equations that yield allowable phases for X(t) when Y(t) has a given phase other than ±π/2, or that yield allowable phases for Y(t) when X(t) has a given phase other than ±π/2. But regardless of which equations are used, they all define the same preferred phase relationship(s) shown in FIGS. 5A and 5B.

Still referring to FIGS. 4, 5A, and 5B, to illustrate the concept of such a preferred phase relationship, equation (12) is solved for the X(t) and Y(t) of FIGS. 5A and 5B, where $n_h$=9. Specifically, according to equation (12), a preferred phase relationship exists when for each peak (phase=±π/2) of X(t), the total phase of Y(t) is given by TABLE I:

TABLE I

| k | Total Phase of Y(t) |
|---|---|
| 4 | 0π |
| 5 | π/9 |
| 6 | 2π/9 |
| 7 | 3π/9 |
| 8 | 4π/9 |
| 9 | 5π/9 |
| 10 | 6π/9 |
| 11 | 7π/9 |
| 12 | 8π/9 |
| 13 | π |
| 14 | 10π/9 |
| 15 | 11π/9 |
| 16 | 12π/9 |
| 17 | 13π/9 |

TABLE I-continued

| k | Total Phase of Y(t) |
|---|---|
| 0 | 14π/9 |
| 1 | 15π/9 |
| 2 | 16π/9 |
| 3 | 17π/9 |

As shown in FIGS. 5A and 5B, for each peak of X(t), the total phase of Y(t) does indeed equal one of the values in TABLE I. More specifically, FIG. 5A shows that a first preferred phase relationship exists when the total phase of Y(t) equals a respective odd multiple of π/9 for each peak of X(t), and FIG. 5B shows that a second preferred phase relationship exists when the total phase of Y(t) equals a respective even multiple of π/9 for each peak of X(t). Although both the first and second preferred phase relationships yield the scan pattern 40 (FIG. 4), the scan assembly (FIG. 17) scans the pattern 40 by sweeping the image beam in a first direction for the first preferred phase relationship and in the opposite direction for the second preferred phase relationship. But because the sweep direction typically does not affect the quality of the scanned image, either preferred phase relationship typically yields an acceptable scanned image.

Figure 6:
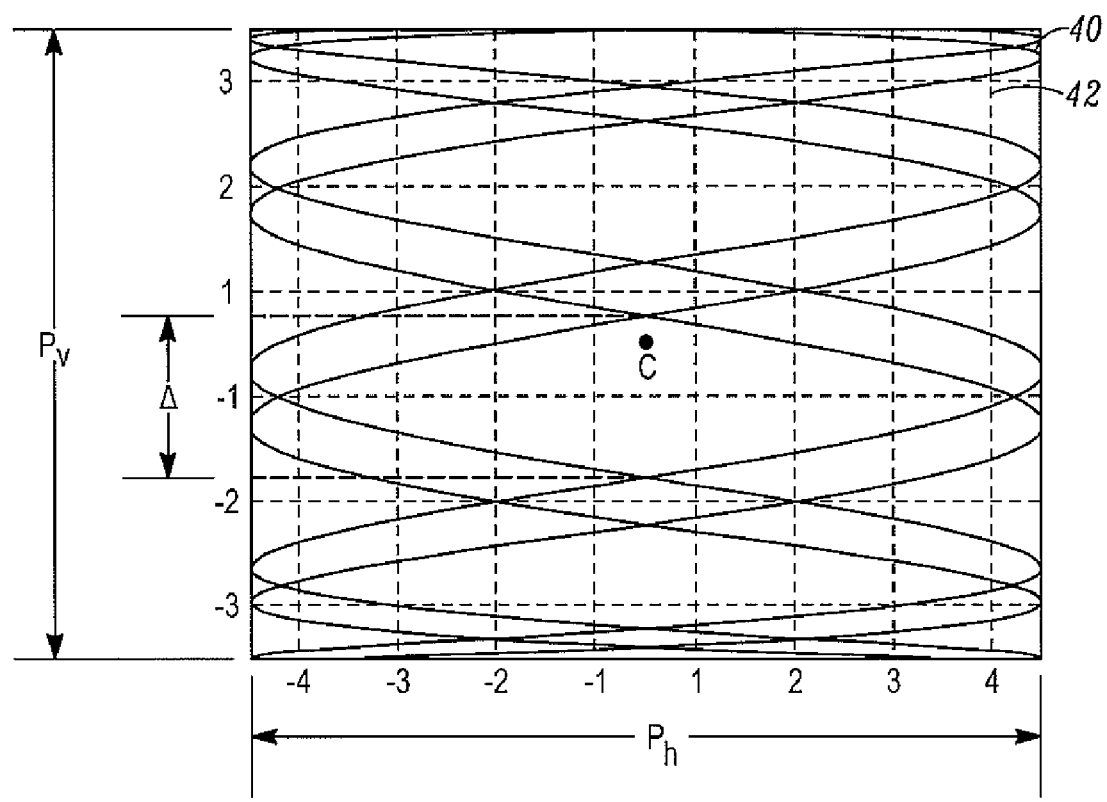
FIG. 6 is a plot of the bi-sinusoidal scanning pattern of FIG. 4, where the phase relationship between the horizontal and vertical sweeping sinusoids is not optimal according to an embodiment of the invention.
Figure 7:
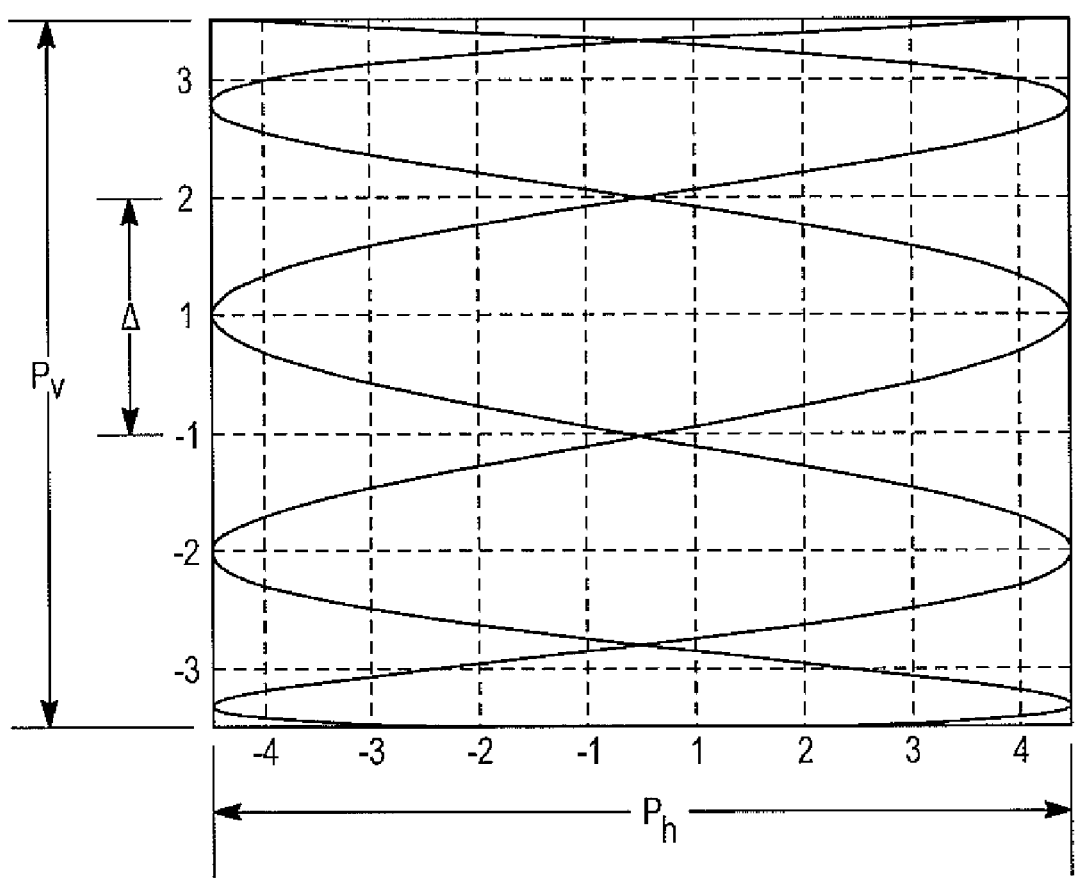
FIG. 7 is a plot of the bi-sinusoidal scanning pattern of FIG. 4, where the phase relationship between the horizontal and vertical sweeping functions is worst case according to an embodiment of the invention.
Figure 8:
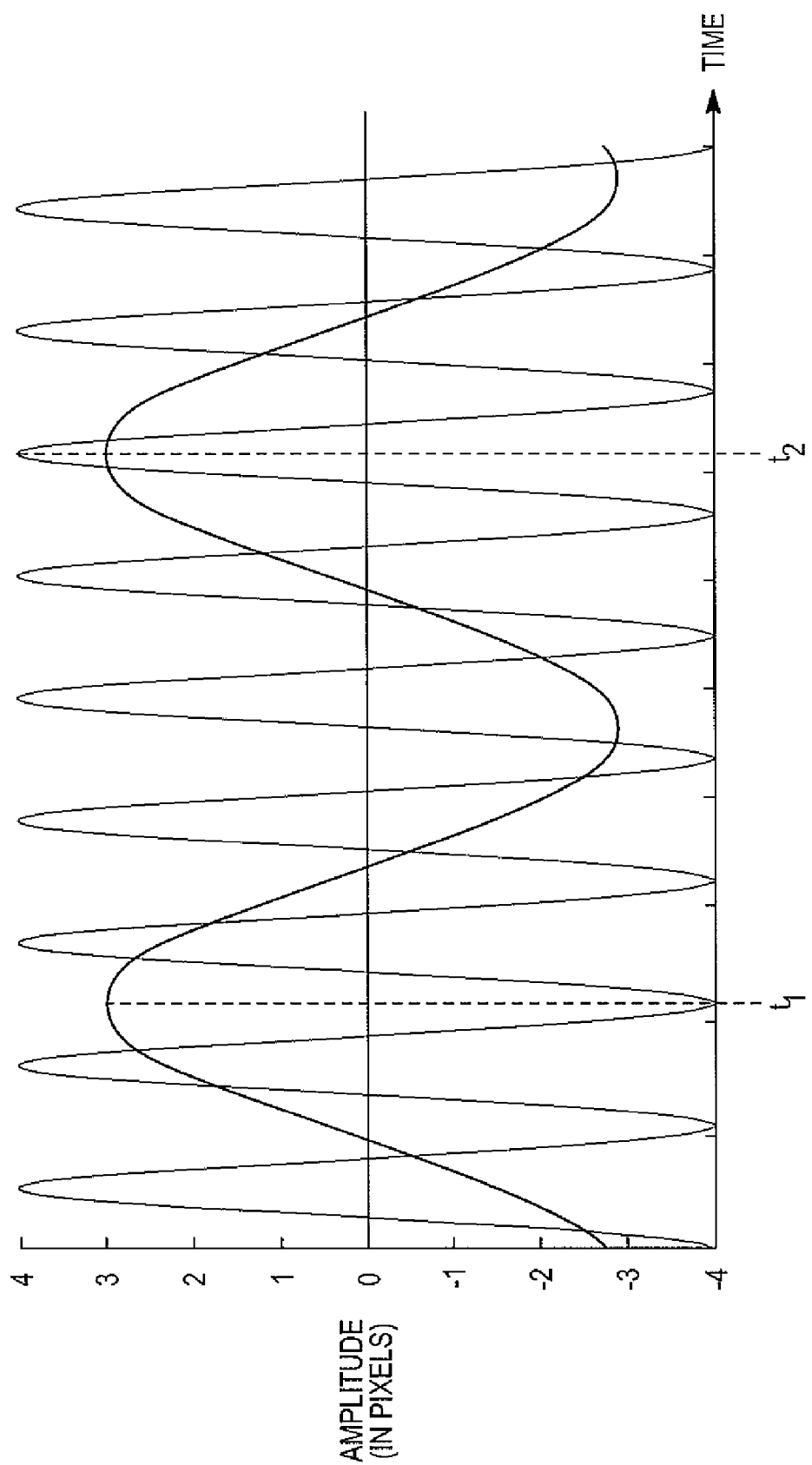
FIG. 8 is a plot of the horizontal and vertical sweeping functions versus time, where the sinusoids have the worst-case phase relationship that yields the scanning pattern of FIG. 7 according to an embodiment of the invention.

Referring to FIGS. 6-8, the undesirable effects of shifting the phase relationship between X(t) and Y(t) from a preferred phase relationship toward and to a worst case is discussed. Specifically, shifting the phase relationship causes an undesirable increase in the maximum line width Δ (FIGS. 6 and 7) from its theoretical minimum value (FIG. 4).

FIG. 6 is a plot of the bi-sinusoidal scanning pattern 40 of FIG. 4, where the phase relationship between X(t) and Y(t) is not preferred, and thus where the maximum line width Δ is larger than its theoretical minimum value (FIG. 4). The scanning pattern 40 has two components. During a first cycle of the vertical sweep function Y(t), the scan assembly (FIG. 17) sweeps the first component, and during a second cycle of Y(t), the scan assembly sweeps the second component, which is spatially offset from the first component. As the phase relationship between X(t) and Y(t) begins to shift from the preferred, the first and second components effectively move toward each other, thus increasing the maximum line width Δ. While the preferred phase relationship may be considered optimal, the system can be operated away from this optimum where other systems considerations, such as cost, make such operation desirable. The increased maximum line width Δ may introduce image artifacts, though these may be acceptable for some applications.

FIG. 7 is a plot of the bi-sinusoidal scanning pattern 40 of FIG. 4, where the phase relationship between X(t) and Y(t) is worst case, and thus where the maximum line width Δ has its largest value. The worst-case phase relationship effectively causes the first and second components of the pattern 40 to merge such that they overlap one and other. During a first cycle of the vertical sweep function Y(t), the scan assembly (FIG. 17) sweeps the first component from the top left of the pattern 40 to the top right. And during the second cycle of Y(t), the scan assembly sweeps the second component by retracing the first component from the top right of the pattern 40 to the top left. That is, the scan assembly effectively sweeps the pattern 40 in one direction during the first cycle of Y(t) and retraces the pattern in the other direction during the second cycle of Y(t). Because the two components are overlapping, the resulting worst-case Lissajous pattern 40 is equivalent to a single-component pattern having $n_v=1$, $n_h=4.5$, and a maximum line width Δ≈2 pixels, which is twice the theoretical minimum of ~1 pixel as shown in FIG. 4.

FIG. 8 is a plot of X(t) and Y(t) versus time for a first worst-case phase relationship that yields the Lissajous pattern 40 of FIG. 7. A worst-case phase relationship occurs when there is maximum correlation between the peaks of X(t) and Y(t). More specifically, a worst-case phase relationship occurs when a peak of X(t) periodically coincides with a peak of Y(t). For example, at times t1 and t2, the positive peaks of Y(t) respectively coincide with a negative and a positive peak of X(t) to yield the first worst-case phase relationship. These peak coincidences respectively correspond to the top left and top right of the pattern 40, where the scan assembly effectively "bounces" the image beam into and back out of the top left and top right "corners" of the pattern 40.

Referring to FIGS. 7 and 8, a second worst-case phase relationship occurs when the negative peaks of Y(t) respectively coincide with a negative and a positive peak of X(t), and thus yields a Lissajous scan pattern that is upside down relative to the pattern 40.

Therefore, referring to FIGS. 4-8, each preferred phase relationship for X(t) and Y(t) is exactly half-way between two respective worst-case phase relationships, and equations (9)-(12) yield these half-way points. Specifically, where $n_h=9$ and $n_v=2$, for the first and second worst-case phase relationships the total phase of Y(t) is an odd multiple of π/18 for each peak (±π/2) of X(t) (see FIG. 8), and for the first and second preferred phase relationships, the total phase of Y(t) is an even multiple of π/18 for each peak of X(t) per equation (12). Consequently, because the even multiples of π/18 are exactly half-way between the odd multiples of π/18, the two preferred phase relationships are half-way between the two worst-case phase relationships.

Offsetting a Source-Image Switch Rate $f_s$ from the Vertical Sweep Frequency $f_v$ for a Bi-Directional Vertical Sweep As discussed below in conjunction with FIGS. 9 and 10, a viewer (not shown) may perceive artifacts such as false ghost objects when video images are scanned in a temporal sequence that is different from the temporal sequence of the corresponding source images. More specifically, the human eye may perceive such artifacts in video images that are bi-directionally scanned in the vertical dimension if the rate fs at which the image beam is switched from one source image to the other is synchronized to the vertical sweep frequency $f_v$. A viewer perceives a true ghost object when he views an object that is moving faster than the image persistence of his eye. Specifically, when the eye perceives an object, the image of the object persists for a certain period of time, which is approximately a few milliseconds, even after the object moves from the location in which the eye initially perceived it. If the object is moving fast enough, then the eye perceives a "blur", which is equivalent to simultaneously perceiving the object in multiple locations. One can observe this phenomenon for by moving a finger quickly back and forth while attempting to view the finger. "Ghost object" is merely another name for this blur, and refers to the eye's perception of an object in one or more locations that the object does not occupy. A false ghost object is a ghost object that a viewer perceives in a sequence of video images but that he would not perceive if he had viewed the object directly. Typically, false ghost objects are caused by errors introduced while capturing or scanning an image.

FIG. 9 is a view of three sequential scanned video images 50*a*-50*c*, where the bi-directional scanning of the images in the vertical dimension may cause a viewer (not shown) to perceive false ghost objects 52 and 54.

The bi-sinusoidally scanned images 50a-50c each correspond to a respective source video image S1-S3, and depict motion of a ball 56 and a toy car 58. That is, the image 50a is a bi-sinusoidally scanned reproduction of S1, the image 50b is a bi-sinusoidally scanned reproduction of S2, and the image 50c is a bi-sinusoidally scanned reproduction of S3. The image generator (FIG. 17) may receive the pixels of the source images S from an image buffer (FIG. 17) or in real time via a stream of video data.

The source images S1-S3 are captured such that a known time elapses between the capture of a moving object from one source image to the next. Specifically, if the source images S are captured by a conventional raster scan or light-integration technique, then the elapsed time between the capture of pixels in the same relative location of successive source images S is substantially constant. For example, if the source images S1-S3 are so captured at a rate of 30 Hz (1/30$^{th}$ second per image), then the elapsed time between the pixels P1 in S1 and P2 in S2 equals 1/30 seconds, as does the elapsed time between the pixels P3 in S2 and P4 in S3. Consequently, the relative distance between the positions of the ball 56 in the source images S1 and S2 represents the movement of the ball during the approximately 1/30$^{th}$ of a second that elapses between the capture of the ball in these two positions. Similarly, the relative distance between the positions of the car 58 in the source images S2 and S3 represents the movement of the car during the approximately 1/30 of a second that elapses between the capture of the car in two positions.

But by repeatedly switching from one source image S to the next source image S in the same relative location of the images 50, an image generator (FIG. 17) that scans the images 50 bi-directionally in the vertical dimension may generate sequential occurrences of a moving object so quickly that the eye perceives a false ghost object in this relative location. In the example of FIG. 9, $f_s=2f_v$ because the image generator switches the image beam from the source image S1 to the source image S2 at the top of the scanned image 50b, switches the beam from S2 to S3 at the bottom of the image 50b, and repeats this switching pattern for subsequent images S and 50. Consequently, assuming that $f_v=15$ Hz, and each image 50 is scanned in 1/30$^{th}$ of a second, and the ball 56 is approximately 1/8 of the way down from the tops of the images 50, the time t that elapses between the generation of the ball 56 in the image 50a and the generation of the ball in the image 50b is approximately 1/4×1/30=1/120$^{th}$ of a second, which is significantly less than the actual 1/30$^{th}$ of a second between the positions of the ball in the source images S1 and S2. Therefore, if T is less than the persistence of the human eye, then as one views the scanned image 50b, he perceives the ball 56 as being in its S1 and S2 locations simultaneously, where his persistent perception of the ball from the image 50a gives rise to the false ghost object 52 in the image 50b. Looking at this another way and using the above example to illustrate, the vertical bi-directional scan effectively increases the perceived speed of the ball 56 fourfold by "tricking" the viewer into perceiving that the ball moved between its positions in 50a and 50b in 1/120$^{th}$ second instead of in the actual 1/30$^{th}$ of a second. And even if the ball 56 was traveling fast enough to generate a true ghost object, the above-described phenomenon may still generate a false ghost object 52 by exacerbating the true ghost object. Similarly, if the time that elapses between the generation of the car 58 in the images 50b and 50c T is less than the persistence of the human eye, then as the viewer views the scanned image 50c, he perceives the car 58 as being in its 50b and 50c locations simultaneously. Consequently, this persistent perception of the car from the image 50b gives rise to the false ghost object 54 in the image 50c.

Still referring to FIG. 9, one way to reduce or eliminate the perception of false ghost objects is to scan the images 50a in only one vertical direction. For example, instead of scanning the image 50a from bottom to top during a first half of a first vertical sweep cycle and scanning the image 50b from top to bottom during the second half of the first cycle, the scan assembly (FIG. 17) can scan the image 50a from bottom to top during the first half of the first vertical cycle, inactivate the image beam during the second half of the first cycle, and then scan the image 50b from bottom to top during the first half of a second vertical cycle. As long as $f_v$ is not much greater than the frequency at which the images S1-S3 are captured, this uni-directional vertical scan substantially eliminates false ghost objects.

Referring to FIG. 10, another technique for reducing or eliminating false ghost objects is to select $f_s$ such that it is out of sync with $f_v$, i.e., such that the image generator (FIG. 17) does not frequently switch from one source image S to another at the same relative location of the scanned images 50.

For example, where $f_s=8f_v/5$, the image generator (FIG. 17) first generates the image beam from the pixels of the source image S1 as it scans the image 50a from the bottom 60a to the top 62a.

Then, the image generator starts scanning the image 50b from the top 62b, but does not begin generating the beam from the pixels of the source image S2 until line 64b, which is 1/4 way down the image 50b and 5/4 images 50 down from the bottom 60a. That is, the top 1/4 of the image 50b is the same as the top 1/4 of the image 50a because the image generator continues generating the image beam from the source image S1 until line 64b of the image 50b.

Next, the image generator finishes scanning the image 50b from the line 64b downward while generating the image beam from pixels of the source image S2.

Then, the image generator starts scanning the image 50c from the bottom 60c, but does not switch the generation of the beam to the pixels of the source image S3 until the line 66c, which is 1/2 way up the image 50c and 5/4 images 50 from the line 64b. That is, the bottom 1/2 of the image 50c is the same as the bottom 1/2 of the image 50b because the image generator continues generating the image beam from the source image S2 until the line 66c of the image 50c.

Next, the image generator finishes scanning the image 50c from the line 66c upward while generating the image beam from pixels of the source image S3.

Then, the image generator starts scanning the image 50d from the top 62d, but does not switch the generation of the beam to the pixels of the source image S4 until the line 68d, which is 3/4 the way down the image 50c and 5/4 images 50 from the line 66c. That is, the top 1/2 of the image 50d is the same as the top 1/2 of the image 50c because the image generator continues generating the image beam from the source image S3 until the line 68 of the image 50d.

Next, the image generator finishes scanning the image 50d from the line 68d downward while generating the image beam from pixels of the source image S4.

Then, the image generator starts scanning the image 50e from the bottom 60e, but does not switch the beam to the pixels of the source image S5 until the top 62e of the image 50e.

The image generator continues on in this manner, and the switching lines 60, 62, 64, 66, and 68 periodically repeat. However, the frequency of switching at any one line is low enough to reduce or eliminate the perception of false ghost objects.

Although this technique may generate false ghost objects at a switching line, it has been empirically determined that because the switching line effectively moves from scanned image 50 to scanned image 50 such that the frequency of switching at a particular line is relatively low, the false ghost objects are less noticeable or unnoticeable. The occurrence of false ghost objects may be further reduced if the period at which a particular switch line repeats is greater than the persistence of the human eye. For example, if the time between a source-image switch at the line 66 and the following switch at the line 66 is greater than the persistence of the human eye, a viewer is less likely to perceive false ghost objects near the line 66.

Furthermore, although an example where $fs=8f_v/5$ is discussed, there are other relationships between $f_s$ and $f_v$ that reduce/eliminate false ghost objects. The optimum relationship between $f_s$ and $f_v$ and other artifacts often depends on the application and the actual values of $f_s$ and $f_v$, and thus is often determined on an ad hoc basis.

Modulating the Intensity of the Image Beam Relative to the Location of the Beam

Figure 11:
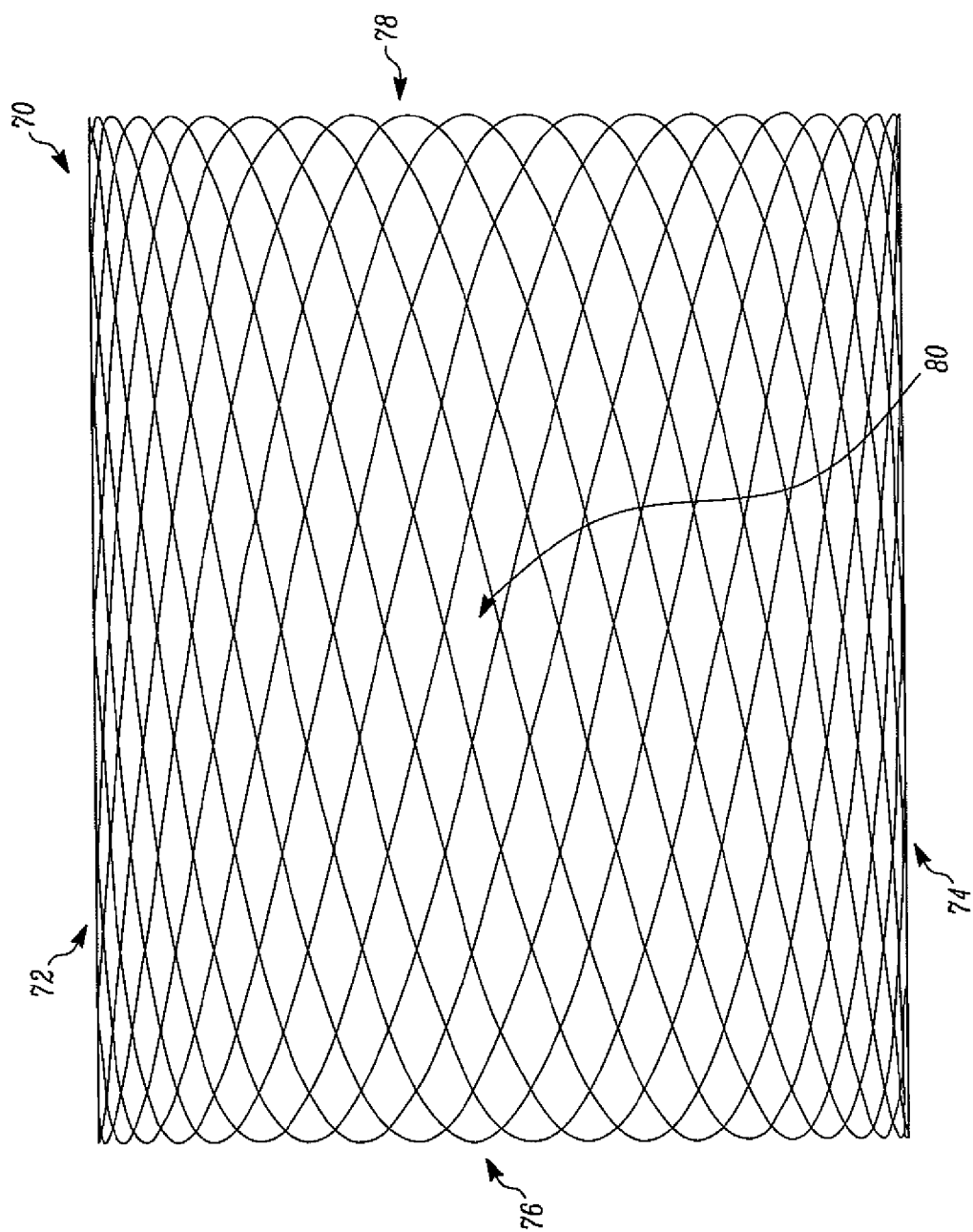
FIG. 11 is a plot of a bi-sinusoidal scanning pattern that may cause the resulting scanned image to have a non-uniform brightness.

Referring to FIG. 11, unless corrected, sinusoidal sweeping of an image beam may cause portions of a scanned image to appear brighter than other portions.

FIG. 11 is a Lissajous pattern 70 that may cause the resulting scanned image to have a non-uniform brightness. As discussed above in conjunction with FIGS. 4-8, an image generator (FIG. 17) scans the pattern 70 by sinusoidally sweeping an image beam bi-directionally in both the horizontal (X) and vertical (Y) dimensions. Due to the sinusoidal sweep functions, the lines of the pattern 70 are closer together, and thus more dense, toward the top region 72, bottom region 74, and side regions 76 and 78 than they are in the center region 80. More specifically, because the top and bottom regions 72 and 74 correspond to the peaks of the vertical sinusoid sweep function Y(t) (see equation (2) and FIGS. 5A and 5B), the beam travels more slowly in the vertical (Y) dimension in these regions than it does in the center region 80. Therefore, because the beam strikes each unit of area in the top and bottom regions 72 and 74 longer than it strikes each comparable unit of area in the center region 80, the image generator sweeps more lines, and thus forms more pixels of the scanned image, per unit area in the top and bottom regions. Consequently, because the pixels are denser in the top 72 and bottom 74 regions, these regions appear brighter than the center region 80 if the image beam has a uniform maximum intensity over the entire pattern 70. Similarly, because the left 76 and right 78 regions correspond to the peaks of the horizontal sinusoid sweep function X(t) (see equation (1) and FIGS. 5A and 5B), the beam travels more slowly in the horizontal (X) dimension in these regions. Therefore, because the pixels are denser in the left 76 and right 78 regions, these regions appear brighter than the center region 80 if the beam has a uniform intensity over the entire pattern 70.

A conventional technique for making the brightness of a scanned image uniform where the beam is sinusoidally swept in the horizontal (X) dimension is to modulate the intensity of the beam in proportion to the instantaneous sweep velocity in the horizontal (X) dimension. Therefore, in the side regions of the scanned image where the beam velocity is lower, the beam intensity is proportionally lower, and in the center regions where the beam velocity is higher, the beam intensity is proportionally higher. More specifically, because the horizontal sweep function $X(t)=\sin(2\pi f_h t+\phi_h)$ denotes the horizontal location of the beam, and using I max to denote the maximum instantaneous intensity of the beam, the modulated instantaneous intensity of the beam equals $I_{max}$ (instantaneous horizontal velocity)/(maximum horizontal velocity)=I max×(d/dt sin(2πf$_h$t+φ$_h$))/max(d/dt sin(2πf$_h$t+φ$_h$)), and is thus given by the following equation:

$$I(\text{modulated-maximum instantaneous beam intensity})=I_{max}\times\cos(2\pi f_h t+\phi_h)/1 \qquad (13)$$

This horizontal modulation technique is further discussed in U.S. Pat. No. 6,445,362 to Tegreene, entitled "SCANNED BEAM DISPLAY WITH VARIATION COMPENSATION", which is incorporated by reference. Intuitively, however, it may seem that modulating the beam intensity according the vertical sweep velocity would not provide the desired results where the vertical sweep frequency $f_v$ is significantly lower than the horizontal sweep frequency $f_h$.

Still referring to FIG. 11, in one embodiment of the invention the image generator (FIG. 17) makes the brightness of a scanned image more uniform by modulating the intensity of the beam in proportion to the instantaneous sweep velocities in both the horizontal (X) and vertical (Y) dimensions. The inventors have determined that modulating the beam intensity according to the vertical sweep velocity does yield desirable results. Therefore, in the top, bottom, and side regions 72, 74, 76, and 78 of the scanned image where the beam velocity is lower, the beam intensity is proportionally lower, and in the center region 80 where the beam velocity is higher, the beam intensity is proportionally higher. Specifically, because the vertical sweep function $Y(t)=\sin(2\pi f_v t+\phi_v)$ denotes the vertical location of the beam, and using $I_{max}$ to denote the maximum instantaneous intensity of the beam, the modulated maximum instantaneous intensity I of the beam is given by the following equation:

$$I=I_{max}\times\cos(2\pi f_h t+\phi_h)\times\cos(2\pi f_v t+\phi_v) \qquad (14)$$

An alternative embodiment is to modulate the intensity of the beam in proportion to the vertical sweep velocity only such that:

$$I=I_{max}\times\cos(2\pi f_v t+\phi_v) \qquad (15)$$

Conventional circuitry that can derive $\cos(2\pi f_v t+\phi_v)$ and/or $\cos(2\pi f_h t+\phi_h)$ from the sinusoidal sweeping functions X(t) and Y(t) of equations (1) and (2) and accordingly modulate the intensity of the beam is relatively simple, thus making this modulation technique relatively easy to implement.

Figure 12:
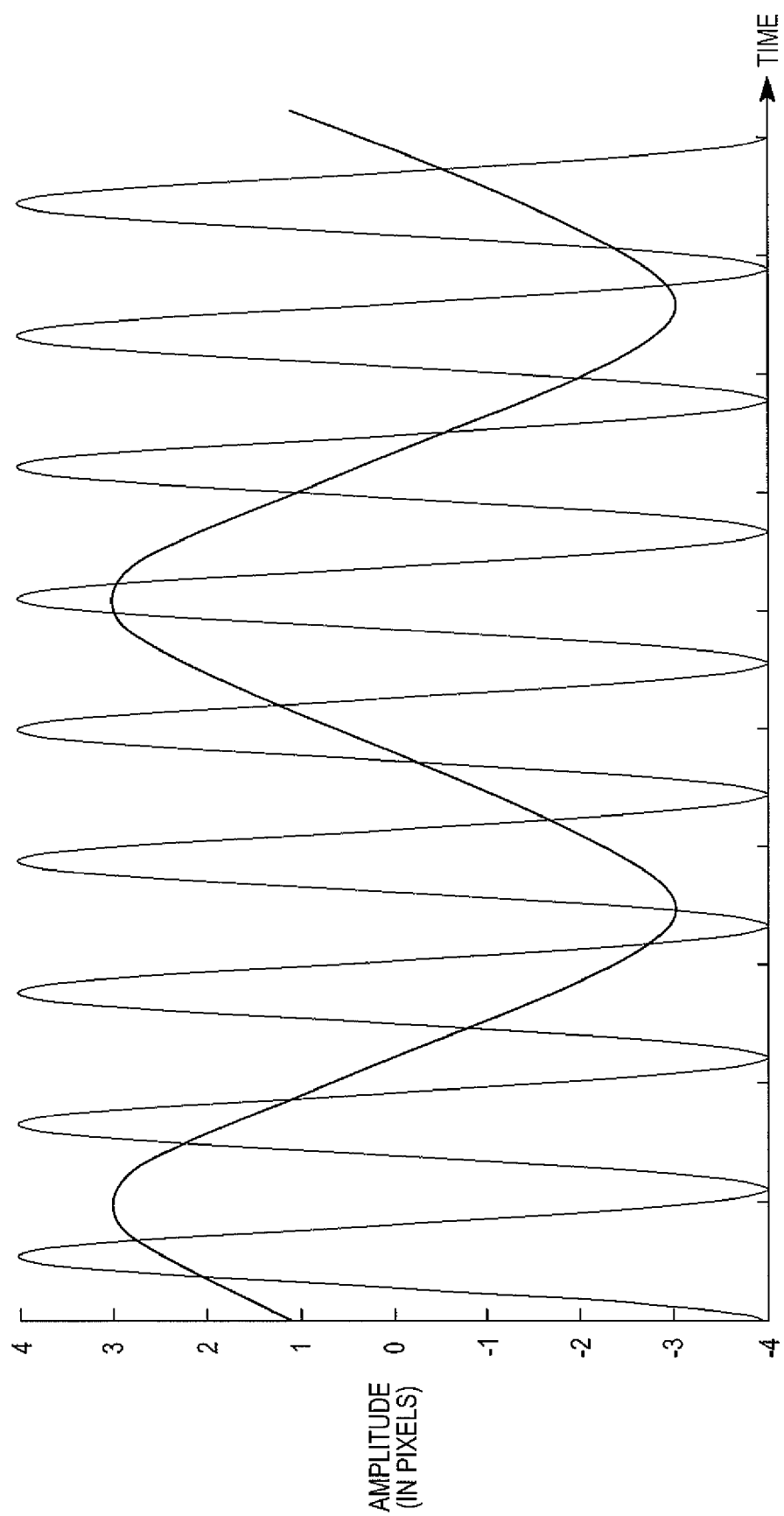
FIG. 12 is a plot of horizontal and vertical sweeping functions versus time, where the vertical sweeping function is modified according to an embodiment of the invention to improve the brightness uniformity of a resulting scanned image.

Referring to FIGS. 11 and 12, in another embodiment of the invention the image generator (FIG. 17) sweeps the image beam more linearly in the vertical (Y) dimension to improve the brightness uniformity of a scanned image.

FIG. 12 is a plot of the horizontal and vertical sweeping functions X(t) and Y(t) versus time for $n_v=2$, $n_h=9$, $p_v=6$, and $p_h=8$, although this embodiment of the invention can be used with other values of $n_v$, $n_h$, $p_v$, and $p_h$. Although the horizontal sweeping function X(t) is sinusoidal as discussed above in conjunction with equation (1) and FIGS. 4-8, the vertical sweeping function Y(t) is a pseudo triangle wave with rounded peaks. By making the slopes of the vertical sweep function Y(t) more linear, the image generator (FIG. 17) sweeps the beam at a more constant velocity in the vertical (Y) dimension, thus making the line density, and thus the brightness, more uniform in the top, bottom, and center regions 72, 74, and 80 of the pattern 70 (FIG. 11). More specifically, this embodiment of the vertical sweep function Y(t) is given by the following equation:

$$Y(t)=(1-u)(p_v/2)\sin(2\pi f_v t+\phi_v)+u(p_v/2)\sin(2\pi 3 f_v t+\phi_v) \qquad (16)$$

where u is an empirically determined scale factor. One can see from equation (16) that the more-linear slopes of the vertical sweep function Y(t) are obtained by adding a third harmonic of $f_v$ to the sinusoidal Y(t) of equation (2). And adding additional odd harmonics beyond the third harmonic makes the slopes more linear by causing Y(t) to approach a triangle wave. Furthermore, as discussed below, one can design an image generator that vertically sweeps a beam according to equation (16) and compute the preferred phase relationship between X(t) of equation (1) and Y(t) of equation (16) according to the concepts discussed above in conjunction with FIGS. 4-8.

Referring to FIGS. 11 and 12, other embodiments for improving the brightness uniformity of the scanned image are contemplated. For example, one can vertically sweep the beam according to equation (15) and modulate the intensity of the beam in proportion to the horizontal sweep velocity, the vertical sweep velocity, or both the horizontal and vertical sweep velocities. Furthermore, one can modulate the beam intensity in proportion to a direct function of the beam location or as a function of a scanning angle of the beam instead of in proportion to a sweep velocity which is the (derivative of the position and scanning angle) of the beam.

Referring again to FIG. 12, another advantage of making the line density of a scan pattern such as the pattern 70 (FIG. 11) more uniform is that it decreases the maximum line width $\Delta$, and thus allows one to achieve a desired value for $\Delta$ with a lower horizontal sweep frequency $f_h$. The following is a more general form of equation (7):

$$\Delta = (\text{max vertical beam velocity})/2f_h n_v \quad (17)$$

where $f_v < f_h$. Therefore, by reducing the maximum vertical beam velocity, which is proportional to the maximum slope (i.e., the maximum of the time derivative) of the vertical sweep function Y(t), one can proportionally reduce $f_h$ yet maintain $\Delta$ at a desired value. Because the maximum slope of the pseudo triangle wave of FIG. 12 is less than the maximum slope of a sinusoid (FIGS. 5A and 5B), using a pseudo triangle wave for Y(t) allows one to reduce $f_h$ without increasing $\Delta$.

Referring yet again to FIG. 12 and to equation (16), the phase and frequency relationships discussed above in conjunction with FIGS. 4-8 are determined according to an embodiment of the invention for a vertical sweep function Y(t) that includes one or more harmonics of $f_v$. Specifically, equations (5), (6), (9), and (12) hold true for the fundamental frequency $f_v$ of any such function Y(t). Furthermore, equation (12) can be modified for each harmonic of $f_v$ by merely multiplying the resulting possible phases by harmonic $f_v/f_v$. For example, the third-harmonic phase equations corresponding to equations (11) and (12) are (equation (11) does not change):

$$2\pi f_h t + \phi_{h0} (\text{the total phase of } X(t)) = \pm \pi/2 \quad (11)$$

$$2\pi 3 f_v t + \phi_{v0} (\text{the total phase of the third harmonic of } Y(t)) = 3(\pi/2 + (\pi/n_h)[k + \tfrac{1}{2}]) \text{ for } k = 0, 1, \ldots (2n_h - 1) \quad (18)$$

Consequently, one can design an image generator that uses a multi-harmonic vertical sweep function Y(t) according to the procedures discussed above in conjunction with FIGS. 4-8. Moreover, using the same principles, one can design an image generator that uses a multi-harmonic horizontal sweep function X(t).

Interpolating the Intensities of the Scanned Pixels from the Source Pixels

Figure 13:
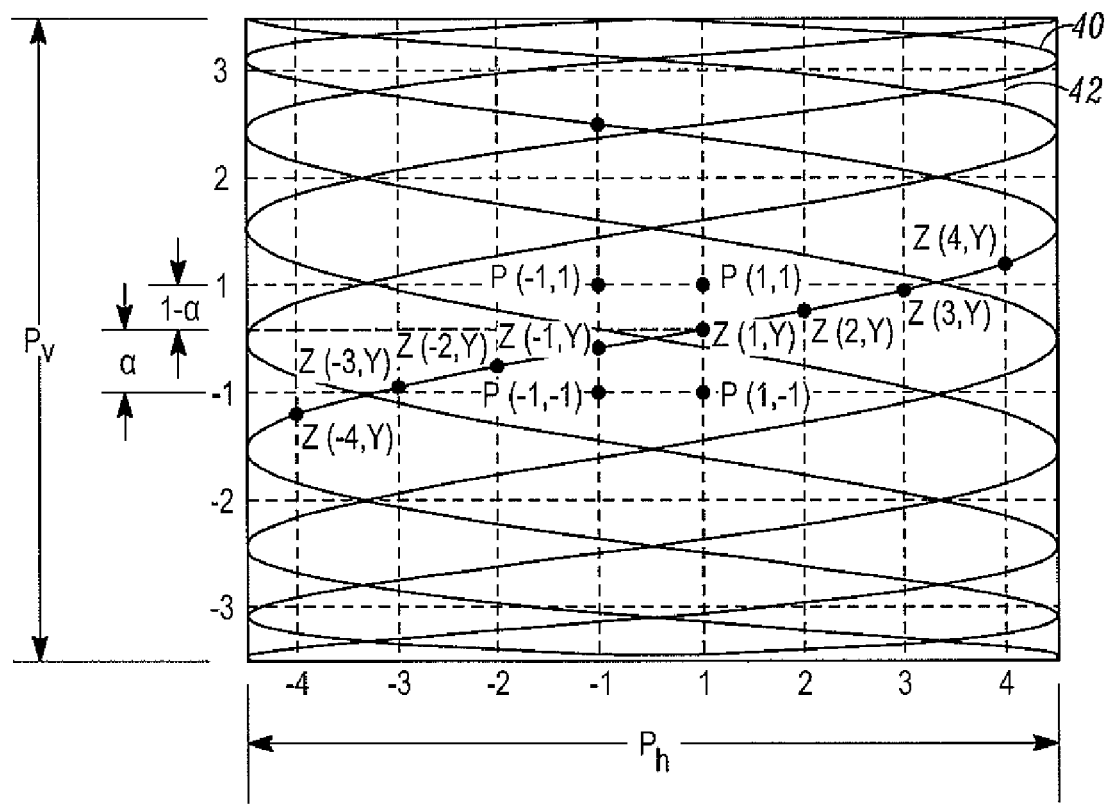
FIG. 13 is a plot of the scanning and grid patterns of FIG. 4 and illustrates a technique for interpolating the pixels of a scanned image from the pixels of a corresponding source image according to an embodiment of the invention.
Figure 14:
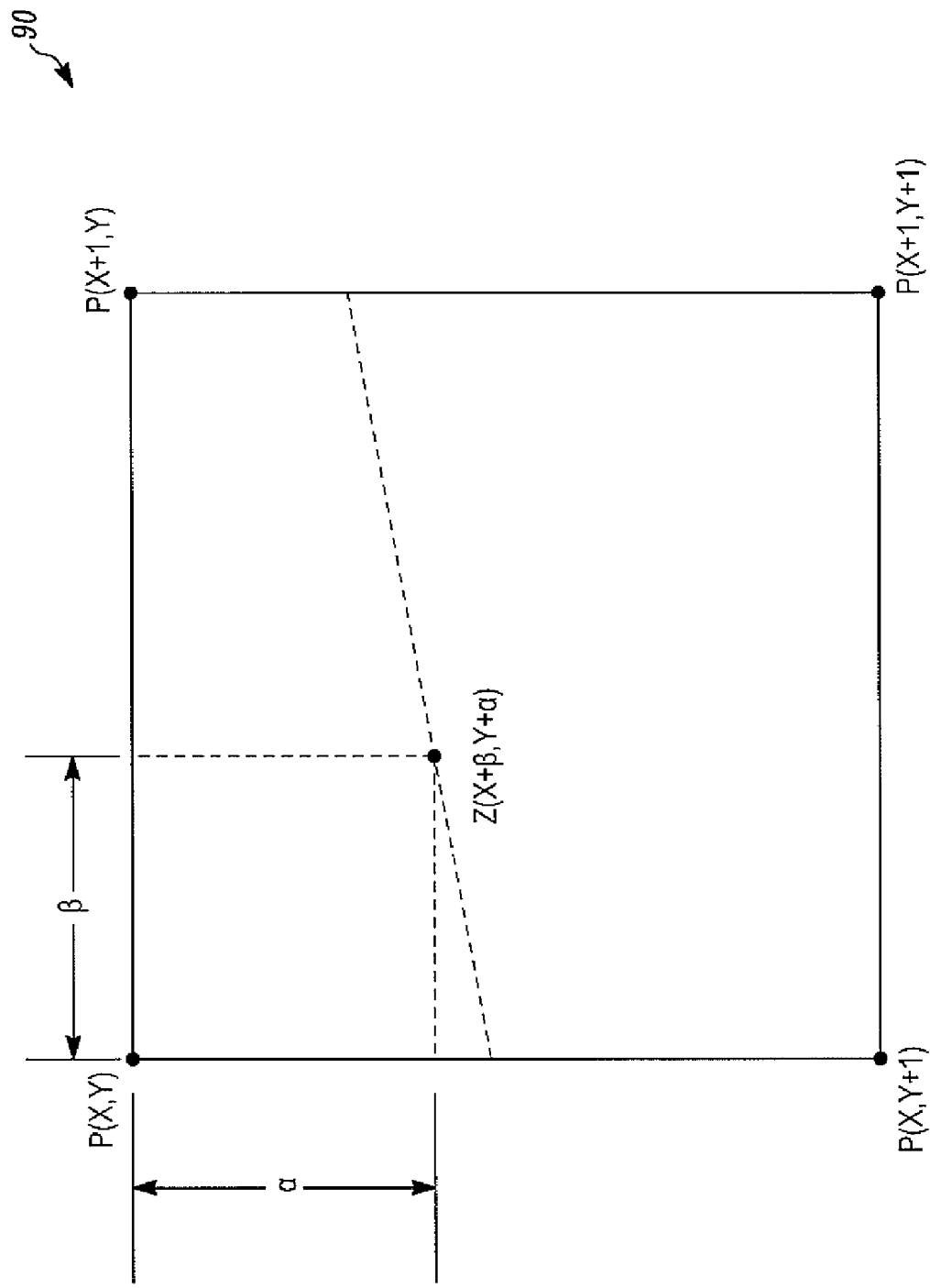
FIG. 14 is a portion of the scanning and grid patterns of FIG. 13 and illustrates a technique for interpolating the pixels of a scanned image from the pixels of a corresponding source image according to another embodiment of the invention.
Figure 15:
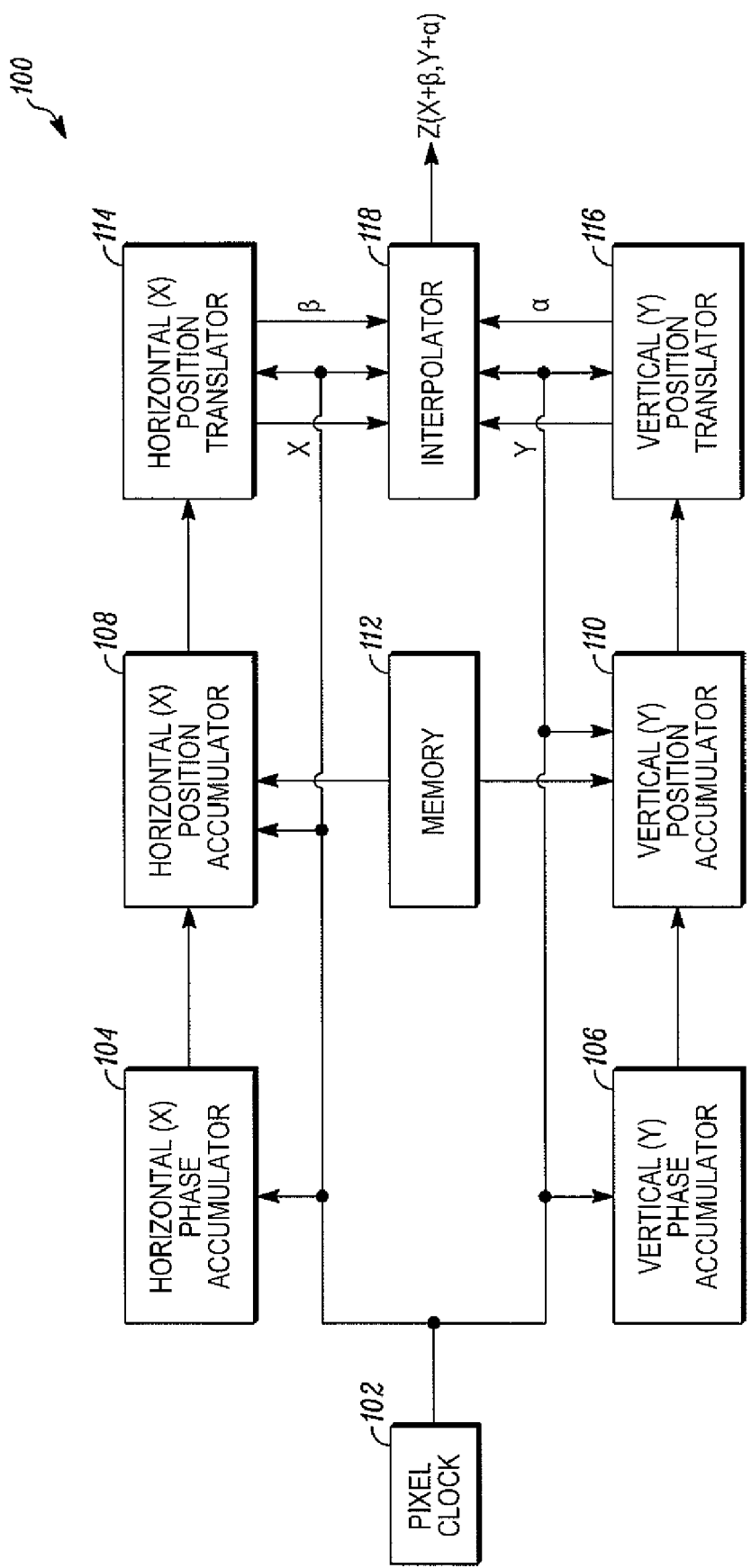
FIG. 15 is a block diagram of an interpolation circuit that can interpolate the pixels of a scanned image using the techniques illustrated in FIGS. 13 and 14 according to an embodiment of the invention.

Referring to FIGS. 13-15, because a sinusoidal scanning pattern typically does not intersect the locations of the source pixels from the source image, the locations of the scanned pixels typically do not coincide with the locations of the source pixels. Consequently, the image generator (FIG. 17) may interpolate the intensities of the scanned pixels from the intensities of the source pixels to improve the quality of the scanned image.

FIG. 13 is a plot of the bi-sinusoidal scanning pattern 40 and the grid pattern 42 of FIG. 4, and illustrates a technique for forming the scanned pixels Z on the vertical grid lines and interpolating their intensities from the vertically adjacent source pixels P according to an embodiment of the invention.

To locate the scanned pixels Z coincident with the vertical lines of the grid pattern 42, the image generator (FIG. 17) generates a non-linear pixel clock that indicates when the image beam intersects a vertical grid line. Because the horizontal sweep function X(t) is non-linear—here a sinusoid per equation (5)—the time from when the beam intersects a vertical grid line to the time when it intersects an immediately adjacent vertical grid line differs from grid line to grid line. For example, it takes longer for the beam to travel between the grid lines 3 and 4 (pixels $Z_{4,y}$ and $Z_{3,y}$) than it does for the beam to travel between the grid lines $-1$ and 1 (pixels $Z_{1,y}$ and $Z_{1,y}$). This is because the beam travels more slowly in the horizontal (X) dimension near the sides of the pattern 40—the sides correspond to the peaks of the horizontal sinusoid—than it does near the center—the center corresponds to the zero crossings of the horizontal sinusoid. Therefore, the image generator generates the pixel clock such that its instantaneous period is proportional to the horizontal velocity of the beam. As a result, the pixel clock "ticks" whenever the beam intersects a vertical grid line (or a predetermined offset time before this intersection) regardless of the horizontal position of the beam. A technique for generating such a pixel clock is disclosed in previously incorporated U.S. Pat. No. 6,140,979.

Because the scanned pixels Z are coincident with the vertical lines of the grid pattern 42, the image generator interpolates the intensity of each pixel Z from the source pixels P that are immediately above and below the pixel Z on the same vertical grid line. For example, the image generator interpolates the intensity of the pixel $Z_{1,y}$ from the intensities of the source pixels $P_{1,1}$ and $P_{1,-1}$. In one embodiment, the image generator computes the intensity $IZ_{1,y}$ of $Z_{1,y}$ according to the following conventional linear-interpolation equation:

$$IZ_{1,y} = \alpha IP_{1,1} + (1-\alpha) IP_{1,-1} \quad (19)$$

where $\alpha$ is the absolute value of the vertical distance between $P_{1,-1}$ and $Z_{1,y}$, $(1-\alpha)$ is the absolute value of the vertical distance between $P_{1,1}$ and $Z_{1,y}$, and $IP_{1,-1}$ and $IP_{1,-1}$ are the respective intensities of the source periods $P_{1,-1}$ and $P_{1,1}$. The image generator typically retrieves the intensities of the pixels P from the buffer (FIG. 17) that stores the corresponding source image. Alternatively, the image generator may use other conventional interpolation algorithms.

To interpolate the intensities of the scanned pixels Z from the adjacent source pixels P as discussed in the preceding paragraph, the image generator tracks the position of the image beam relative to the grid 42 so that it can determine which pixels P to use for the interpolation. Techniques for tracking the position of the image beam are discussed below.

Still referring to FIG. 13, one technique for tracking the horizontal position of the image beam is to clock a horizontal-position counter with the non-linear pixel clock. For example, when the beam starts at the left edge of the pattern 40, the clock can store an initial count of zero. Then, as the beam moves toward the right and intersects the vertical grid line $p_h = -4$, the pixel clock "ticks" to increment the count by one, and to thus indicate the first pixel in the horizontal dimension. This incrementing continues for each vertical grid line until the pixel clock increments the count to eight when the beam intersects the vertical grid line $p_h$=4. Next, as the beam intersects the vertical grid line $p_h$=3 on its way back from the right edge of the pattern 40, the pixel clock "ticks" to decrement the count by one, and to thus indicate the seventh pixel in the horizontal direction. This decrementing continues for each vertical grid line until the pixel clock decrements the count back to zero. Then this increment/decrement cycle repeats for each subsequent cycle of the horizontal sweep function X(t).

The image generator can track the vertical position of the image beam in a similar manner by generating a non-linear vertical pixel clock and clocking a vertical position counter therewith. To provide a measure of α, the frequency of the non-linear vertical pixel clock can be increased by a scale factor. For example, increasing the frequency by ten provides ten clock "ticks" between each pair of pixels P in the vertical dimension, and thus provides a to a resolution of 0.1 pixels.

Another technique for keeping track of the horizontal and vertical positions of the image beam is discussed below in conjunction with FIG. 15. Other techniques are also available, but are omitted for brevity.

Referring to FIG. 14, because generating a non-linear pixel clock often requires a relatively large and complex circuit, the image generator (FIG. 17) may use a linear pixel clock (a clock having a constant period) to interpolate the intensities of the scanned pixels Z as discussed below.

FIG. 14 is a plot of a section 90 of the grid pattern 42 of FIG. 13 and a scanned pixel Z having an arbitrary location within this grid section according to an embodiment of the invention. Because the linear pixel clock does not force the scanned pixels Z to coincide with the vertical lines of the grid pattern 42, the pixel Z can have any arbitrary location x+β (horizontal component), y+α (vertical component) within the grid section. Therefore, the image generator (FIG. 17) interpolates the intensity IZ of $Z_{x+\beta,y+\alpha}$ from the intensities of the surrounding four source pixels P according to the following conventional bi-linear interpolation equation:

$$IZ=(1-\alpha)[(1-\beta)IP_{x,y}+\beta IP_{x+1,y}]+\alpha[(1-\beta)IP_{x,y+1}+\beta IP_{x+1,y+1}] \quad (20)$$

Equation (20) is valid regardless of the direction in which the scan assembly (FIG. 17) is sweeping the image beam as it forms the pixel $Z_{x+\beta,y+x}$. Alternatively, the image generator may interpolate the intensity IZ according to another interpolation algorithm that uses these four source pixels P, a subset of these four source pixels, other source pixels, or a combination of these source pixels and other source pixels.

FIG. 15 is a block diagram of a position-tracking and interpolation circuit 100 that is operable to track the horizontal and vertical positions x+β and y+α of a bi-sinusoidally-swept image beam according to an embodiment of the invention. The circuit 100 includes a pixel clock circuit 102, horizontal and vertical phase accumulators 104 and 106, horizontal and vertical position accumulators 108 and 110, a memory 112, horizontal and vertical position translators 114 and 116, and an interpolator 118. As discussed further below, the pixel-clock circuit 102 generates a linear pixel clock having a constant clock period. The phase accumulators 104 and 106 respectively track the phases of the horizontal and vertical sweep functions X(t) and Y(t) (equations (1) and (2)). The position accumulators 108 and 110 respectively calculate the horizontal and vertical positions of the image beam from the horizontal and vertical phases and from sweep-function-trajectory approximations from the memory 112. The translators 114 and 116 respectively translate the horizontal and vertical positions into the coordinates of the source-image grid pattern such as the pattern 42 of FIG. 13, and the interpolator 118 calculates the intensity of a scanned pixel $Z_{x+\beta,y+\alpha}$ from the translated horizontal and vertical positions and respective source pixels P.

The clock circuit 102 generates a linear pixel clock having a frequency $f_p$ according to the following equation:

$$f_p = Mf_h \quad (21)$$

where M=$2p_h$. For example, referring to FIG. 13, assume that the phase of the horizontal sweep function X(t) equals −π/2 at the left side of the scanning pattern 40 and +π/2 at the right side, and that $p_h$=8 pixels. As the image generator (FIG. 17) sweeps the image beam through a full horizontal cycle of 2π radians (left side to right side and back to the left side) it generates eight pixels Z during the left-to-right sweep and another eight pixels Z during the right-to-left sweep. As discussed above, because each "tick" of the pixel clock identifies the instant for generating a respective pixel Z, the pixel clock includes sixteen "ticks" per horizontal cycle, and thus equals $16f_h$ (sixteen times the horizontal sweep frequency) in this example.

The horizontal and vertical phase accumulators 104 and 106 respectively track the total phases θ and ψ of the horizontal and vertical sweep functions X(t) and Y(t) according to the following equations:

$$\theta_n = \theta_{n-1} + 2\pi/M \quad (22)$$

$$\psi_n = \psi_{n-1} + (n_v/n_h)2\pi/M \quad (23)$$

where n represents the current "tick" of the pixel clock and n−1 represents the immediately previous "tick". For example, where the horizontal and vertical sweep functions X(t) and Y(t) are sinusoids per equations (1) and (2)

$$\theta = 2\pi f_h t + \phi_h \quad (24)$$

$$\psi = 2\pi f_v t + \phi_v \quad (25)$$

Because the phase of a sinusoid increases linearly versus time, for each "tick" of the pixel clock the horizontal phase θ increases by the same amount 2π/M. For example, where M=16, the horizontal phase θ increments π/8 radians for each "tick", and thus completes a full rotation of 2π every sixteen "ticks", which is equivalent to one cycle of the horizontal sweep frequency $f_h$ per above. Furthermore, because $f_v=f_h n_v/n_h$ (equation (6)), the vertical phase ψ only increases $n_v/n_h$ as fast as θ does. For example, where $n_v$=2, $n_h$=9, and M=16, ψ increments (2/9)×π/8=π/36 radians for each "tick", and thus repeats a full rotation of 2π every seventy two "ticks" of the pixel clock, which is every four and one half cycles of the horizontal sweep frequency $f_h$. This agrees with equation (6) and FIGS. 5A and 5B. Moreover, in one embodiment, $\theta_n$ and $\psi_n$ overflow to zero when they reach 2π.

Figure 16:
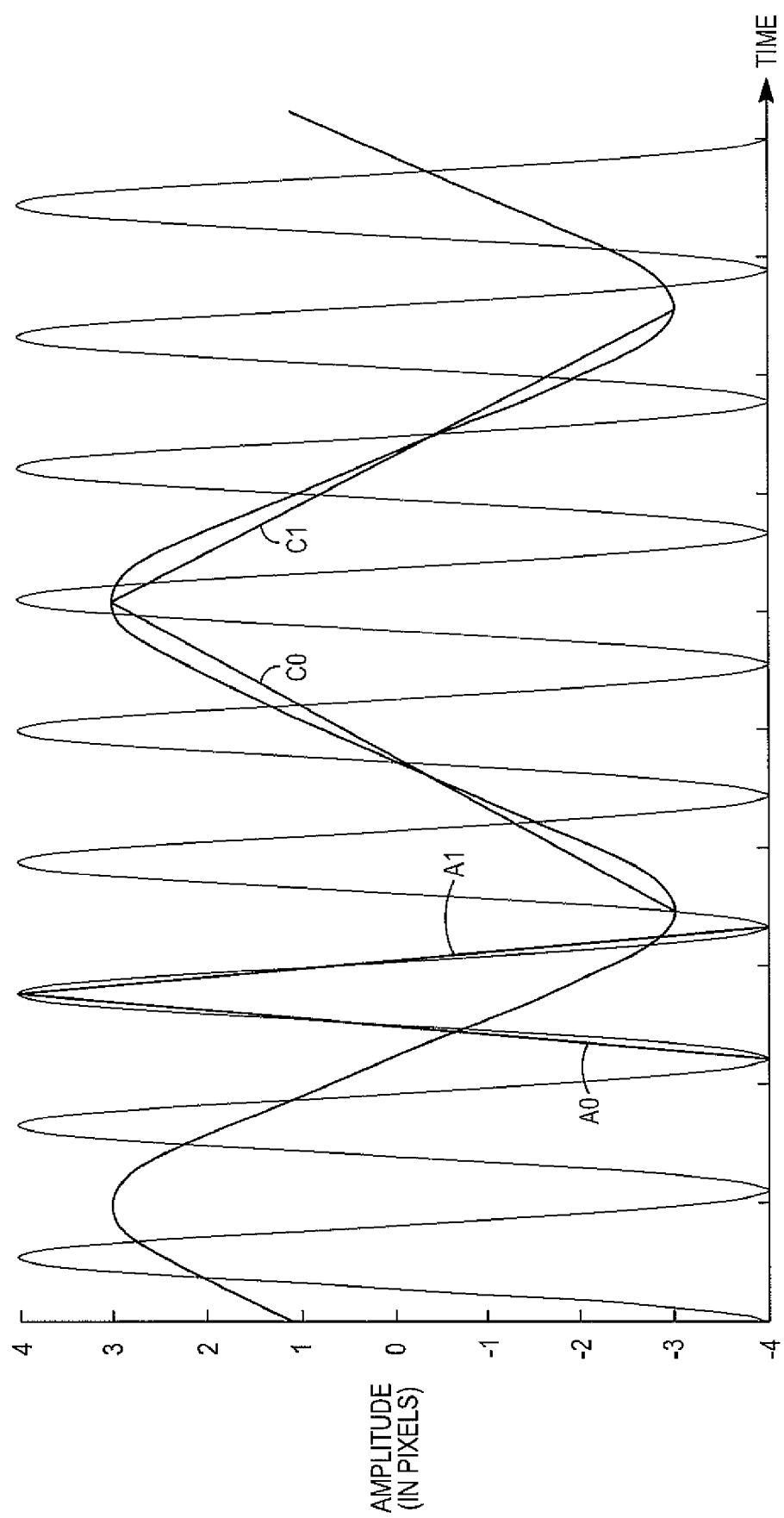
FIG. 16 is a plot of the horizontal and vertical sweeping sinusoids of FIG. 5A and line segments that the interpolation circuit of FIG. 15 uses to linearly approximate the sweeping sinusoids according to an embodiment of the invention.

Referring to FIGS. 15 and 16, the horizontal and vertical position accumulators 108 and 110 respectively track the horizontal and vertical positions X and Y of the image beam according to the following equations:

$$X_n = X_{n-1} + a_j 2\pi/M \quad (26)$$

$$Y_n = Y_{n-1} + c_i(n_v/n_h)2\pi/M \quad (27)$$

where $a_j$ represents a linear approximation of the horizontal sweeping function X(t) at 2π/M, and $c_i$ represents a linear approximation of the vertical sweeping function Y(t) at $(n_v/n_h)2\pi/M$. For example, where X(t) and Y(t) are sinusoidal per equations (1) and (2) above, they can be conventionally represented by respective Taylor series expansions that effectively break down the sinusoids into a number $(j, i)$ of line segments. The more line segments used, the more accurate the linear approximation. $A_j$ and $c_i$ are the slopes of these line segments in units of distance (in terms of source pixels) per radian, where j=0 to the $j_{th}$ line segment approximating X(t), and i=0 to the $i_{th}$ line segment approximating Y(t). Therefore, $a_j 2\pi/M$ is the horizontal distance in pixels $p_h$ traveled by the beam in one clock "tick", and $c_i(n_v/n_h)2\pi/M$ is the vertical distance in pixels $p_v$ traveled by the beam in one clock "tick." The horizontal and vertical position accumulators 108 and 110 respectively retrieve $a_j$ and $c_i$ from the memory 112 based on the horizontal and vertical phases $\theta_n$ and $\psi_n$, and store the retrieved $a_j$ and $c_i$ until $\theta_n$ and $\psi_n$ cause the accumulators 108 and 110 to update $a_j$ and $c_i$ by retrieving updated values therefore.

Still referring to FIGS. 15 and 16, an example is presented to illustrate the operation of the horizontal positional accumulator 108 according to an embodiment of the invention. FIG. 16 is a plot of the horizontal and vertical sweep sinusoids X(t) and Y(t) of FIG. 5A and their respective linear approximations where j=i=0,1. That is, X(t) is approximated with two line segments j=0 and j=1 respectively having slopes $a_0$=(8 pixels)/($\pi$ radians) and $a_1$=−(8 pixels)/($\pi$ radians). Therefore, the horizontal position accumulator 108 uses $a_0$ in equation (26) for $-\pi/2 < \theta_n \leq +\pi/2$, and uses $a_1$ in equation (26) for $+\pi/2 < \theta n \leq -\pi/2$. Specifically, when $\theta_n$ transitions from being less than or equal to $-\pi/2$ to being greater than $-\pi/2$, the horizontal position accumulator 108 retrieves $a_0$ from the memory 112, and stores $a_0$ for repeated use until $\theta_n$ becomes greater than $+\pi/2$. And when On becomes greater than $+\pi/2$, the accumulator 108 retrieves $a_1$ from the memory 112, and stores $a_1$ for repeated use until $\theta_n$ again becomes greater than $-\pi/2$. Consequently, the accumulator 108 need only access the memory 112 twice per horizontal sweep cycle.

Using the above example, the vertical position accumulator 110 operates in a similar manner. Y(t) is approximated by two line segments i=0 and i=1 respectively having slopes $c_0$=(6 pixels)/($\pi$ radians) and $c_1$=−(6 pixels)/($\pi$ radians). The accumulator 110 uses $c_0$ in equation (27) for $-\pi/2 < \psi_n \leq +\pi/2$ and uses $c_1$ in equation (27) for $+\pi/2 < \psi_n \leq -\pi/2$. Specifically, when $\psi_n$ transitions from being less than or equal to $-\pi/2$ to being greater than $-\pi/2$, the vertical position accumulator 110 retrieves $c_0$ from the memory 112, and stores $c_0$ for repeated use until $\psi_n$ becomes greater than $+\pi/2$. And when $\psi_n$ becomes greater than $+\pi/2$, the accumulator 110 retrieves $c_1$ from the memory 112, and stores $c_1$ for repeated use until $\psi_n$ again becomes greater than $-\pi/2$. Consequently, the accumulator 110 need only access the memory 112 twice per vertical sweep cycle.

Referring again to FIG. 15, the horizontal and vertical position translators 114 and 116 respectively shift the horizontal and vertical positions X and Y to be compatible with the grid pattern 42 (FIG. 13) according to the following equations:

$$X_{translated} = X_n + P_h/2 - 0.5 + L_h \quad (28)$$

$$Y_{translated} = Y_n + P_v/2 - 0.5 + L_v \quad (29)$$

where $L_h$ and $L_v$ are optional alignment-correction factors as discussed below.

Specifically, $X_n$ and $Y_n$ are incompatible with the grid pattern 42 (FIG. 13) because they are in terms of the amplitudes of the sweep functions X(t) and Y(t) in units of pixels. For example, where $p_h$=8 and $P_v$=6 as in FIG. 13 and X(t) and Y(t) are sinusoidal, $X_n$ ranges from −4 to +4 pixels and $Y_n$ ranges from −3 to +3 pixels per the amplitudes of the horizontal and vertical sweep sinusoids (FIG. 16).

To be compatible with the grid pattern 42 (FIG. 13), it is desirable that $X_{translated}$ range from −0.5 to +7.5, and that $Y_{translated}$ range from −0.5 to 5.5. Therefore, equations (28) and (29) respectively obtain these preferred ranges for $X_{translated}$ and $Y_{translated}$ by effectively shifting $X_n$ by $P_h/2 - 0.5 = 3.5$ pixels and effectively shifting $Y_n$ by $P_v/2 - 0.5 = 2.5$ pixels.

$L_h$ and $L_v$ of equations (28) and (29), respectively, mathematically account for misalignment of the image beam. In one embodiment of the invention, the horizontal and vertical phase accumulators 104 and 106 are respectively calibrated such that $\theta_n$=0 as the reflector (FIG. 17), rotates through its horizontal $0\pi$ position, and such that $\psi_n$=0 as the reflector rotates through its vertical $0\pi$ position—the reflector position is measured using conventional techniques such as discussed in U.S. Pat. No. 5,648,618 to Neukermans entitled "MICROMACHINED HINGE HAVING AN INTEGRAL TORSIONAL SENSOR", which is incorporated by reference. But if the image beam does not strike the respective horizontal or vertical center of the display screen (FIG. 1) as the reflector rotates through its horizontal and vertical $0\pi$ positions, then the actual position of the beam is offset from the position indicated by the reflector position. Because this offset can typically be measured and is often substantially constant regardless of the beam position, its x and y components are respectively represented by the constants $L_h$ and $L_v$, which have units of pixels. That is, including $L_h$ and $L_v$ in equations (28) and (29) insure that $X_{translated}$ and $Y_{translated}$ represent the actual position of the beam, not merely the position of the reflector. This technique is particularly useful where the image generator (FIG. 17) sweeps three misaligned beams, such as red (R), green (G), and blue (B) beams, to scan a color image. By calculating separate $X_{translate}$ and $Y_{translate}$ values for each beam, the image generator can mathematically correct for this misalignment during interpolation of the scanned pixels Z (FIG. 13) by using appropriate values for $L_{hred}$, $L_{vred}$, $L_{hgreen}$, $L_{vgreen}$, $L_{hblue}$, and $L_{vblue}$.

In one embodiment of the invention the horizontal and vertical position translators 114 and 116 are floating-point counters such that the integer portions of $X_{translated}$ and $Y_{translated}$ are the coordinates of the lowest-number source pixel P and the decimal portions are $\beta$ and $\alpha$, respectively. For example, referring to FIG. 14, where the image beam is positioned to form the scanned pixel $Z_{x+\beta, y+\alpha}$, the integer portions of $X_{translated}$ and $Y_{translated}$ equal x and y, respectively, and the decimal portions equal $\beta$ and $\alpha$, respectively.

Still referring to FIG. 15, the interpolator 118 interpolates the intensities of the scanned pixels Z from the values of $X_{translated}$=x+$\beta$ and $Y_{translated}$=y+$\alpha$ in a conventional manner such as that discussed above in conjunction with FIG. 14.

Other embodiments of the position-tracking and interpolation circuit 100 are contemplated. For example, because the scanning pattern 40 (FIG. 13) repeats itself and because the period of the pixel clock, and thus the locations of the pixels Z, are known in advance, all possible values of $X_{translated}$ and $Y_{translated}$ can be determined in advance and stored in a lookup table (not shown). Therefore, the interpolator 118 need only retrieve $X_{translated}$ and $Y_{translated}$ from this look-up table. Such a circuit, however, would include two memory accesses per pixel clock period. This is unlike the circuit 100 of FIG. 15, where the horizontal and vertical position accumulators 108 and 110 access the memory 12 only when changing from one line segment j and i, and thus from one slope $a_j$ and $c_i$, to another. In addition, the circuit 100 may calculate only the vertical position y+α if a non-linear horizontal pixel clock is used per FIG. 13 such that the pixels Z are aligned with the vertical lines of the grid 42, i.e., β is always zero. In such an embodiment, the horizontal translator 114 can be replaced with a counter that, along with the interpolator 118, is clocked with the non-linear horizontal pixel clock, while the circuits 106, 110, and 116 are clocked with the linear pixel clock generated by the circuit 102.

Image Generator

Figure 17:
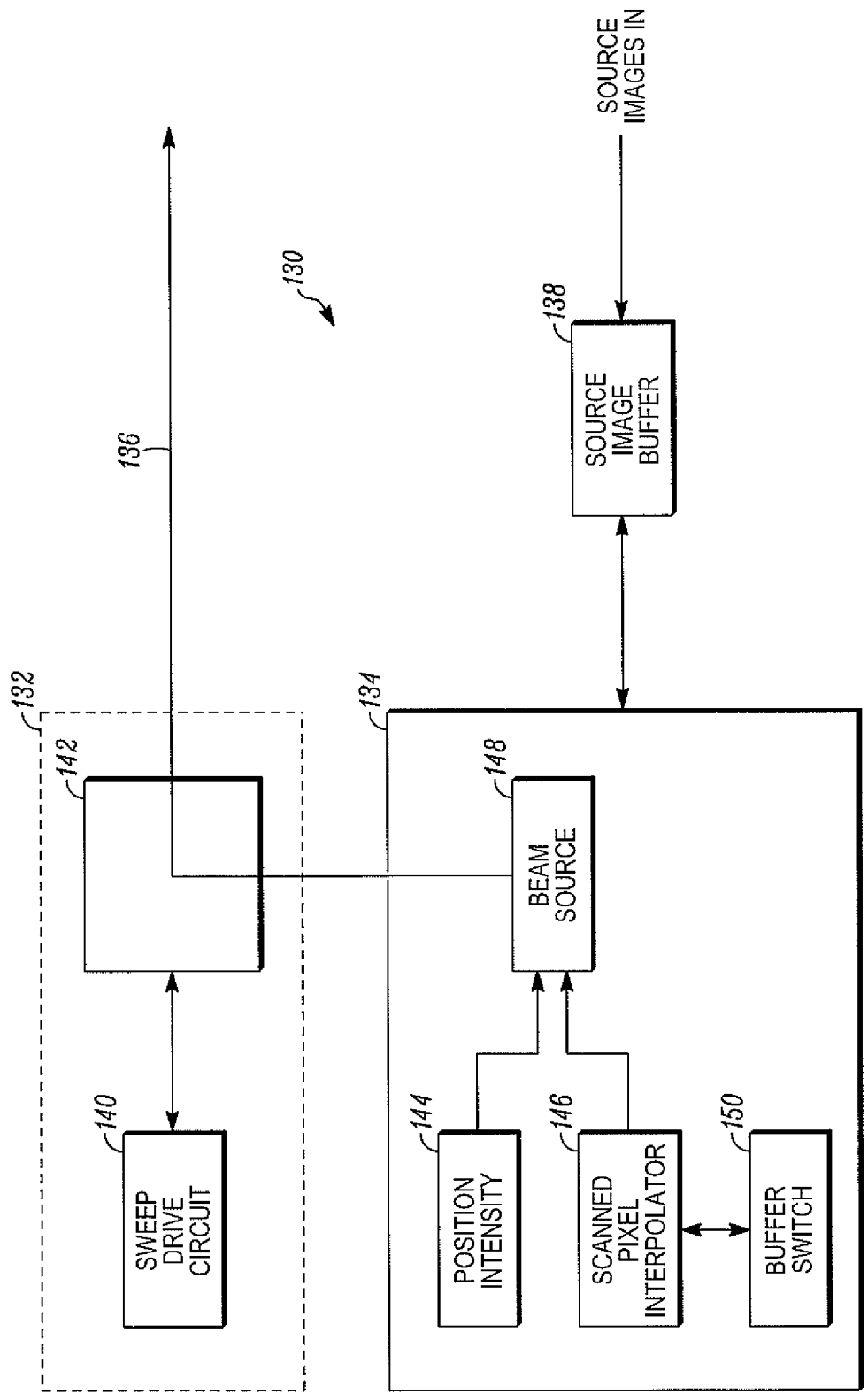
FIG. 17 is a block diagram of an image generator that can function as described above in conjunction with FIGS. 4-16 according to an embodiment of the invention.

FIG. 17 is a block diagram of an image generator 130 that can implement the above-described techniques according to an embodiment of the invention. The image generator 130 includes a scan assembly 132, an image-beam generator 134 for generating an image beam 136, and a source-image buffer 138.

The scan assembly 132 includes a sweep-drive circuit 140 and a conventional reflector 142, such as the reflector 22 of FIG. 1. The circuit 140 can drive the reflector 142 such that the reflector sweeps the beam 136 bi-sinusoidally and/or bi-directionally in the vertical dimension as discussed above in conjunction with FIGS. 4, 5A, 5B, and 12.

The image-beam generator 134 includes a position-intensity circuit 144, a scanned-pixel interpolator 146, a conventional beam source 148, and a buffer-switch circuit 150. The circuit 144 can modulate the intensity of the beam 136 according to the position of the beam as discussed above in conjunction with FIGS. 11 and 12. The interpolator 146 can modulate the intensity of the beam 136 to interpolate the intensities of the scanned pixels Z as discussed above in conjunction with FIGS. 13-16, and may include the circuit 100 of FIG. 15. The beam source 148 generates the beam 136, and may be, e.g., a light-emitting diode (LED) or a laser diode. The switch circuit 150 transitions the generation of the image beam 136, and thus the formation of the scanned pixels 2, from one source image in the buffer 138 to another source image in the buffer to reduce or eliminate the perception of false ghost images as discussed above in conjunction with FIGS. 9 and 10.

The source-image buffer 138 is a conventional buffer that receives source video or still images in a conventional manner from a conventional source. For example, the buffer 138 may receive video images via a stream of video data from a computer (not shown) or from the internet (not shown).

Still referring to FIG. 17, other embodiments of the image generator 130 are contemplated. For example, the beam 136 may be an electron beam for display on a phosphor screen of a cathode-ray tube (CRT), and the reflector may be a coil or other device for sweeping the beam. And where the beam 136 is a light beam, the reflector may direct it onto a display screen (FIG. 1) or directly into a viewer's eye (not shown). Furthermore, although "horizontal" and "vertical" have been used above to denote orthogonal side-to-side and up-down dimensions, respectively, they may denote other respective dimensions that may not be orthogonal. For example, "vertical" may generally denote the dimension having the lower sweep frequency, even if this is not the up-down dimension.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method, comprising:
Sweeping an image beam in a horizontal dimension according to a horizontal sinusoid having a phase; and
sweeping the image beam back and fourth in a vertical dimension according to a vertical sinusoid, wherein the image beam is swept while the image beam is "on" from a first edge of an image to a second edge of the image continuously in a first direction of the vertical dimension, and wherein the image beam is swept while the image beam is "on," from the second edge of the image to the first edge of the image continuously in a second direction of the vertical dimension, such that the image beam traverses a pattern that repeats every $n_h$ periods of the horizontal sinusoid, the vertical having a phase equal to $$-\frac{\pi}{2} + \frac{\pi}{n_h}\left[k + \frac{1}{2}\right]$$

when the phase of the horizontal sinusoid equals $$\pm\frac{\pi}{2}$$

and where k=0, 1, ... (2$n_h$−1).

2. The method of claim 1 wherein sweeping the image beam in the horizontal dimension comprises sweeping the image beam back and forth in the horizontal dimension.

3. The method of claim 1 wherein:
sweeping the image beam in the horizontal dimension comprises sinusoidally sweeping the image beam in the horizontal dimension at a horizontal frequency; and
sweeping the image beam in the vertical dimension comprises sinusoidally sweeping the image beam back and forth in the vertical dimension at a vertical frequency that is lower than the horizontal frequency.

4. The method of claim 1 wherein sweeping the image beam back and forth in the vertical dimension comprises sweeping the image beam along a path that is a function of a fundamental vertical frequency and a harmonic of the fundamental vertical frequency.

5. The method of claim 1 wherein the horizontal dimension is substantially orthogonal to the vertical dimension.

6. The method of claim 1, wherein sweeping the image beam in the horizontal dimension comprises sweeping the image beam bi-directionally in the horizontal dimension.

7. The method of claim 1, further comprising:
a first reflector sweeping the image beam in the horizontal dimension; and
a second reflector sweeping the image beam in the vertical dimension.

8. The method of claim 1, further comprising a single reflector simultaneously sweeping the image beam in the horizontal dimension and the vertical dimension.

9. The method of claim 1 further comprising:
sweeping the image beam in the horizontal dimension by resonating at a horizontal frequency; and
sweeping the image beam in the vertical dimension by resonating at a vertical frequency.

10. The method of claim 1 having horizontal and vertical resonant frequencies and further comprising sweeping the image beam in the horizontal dimension by resonating at the horizontal frequency; and sweeping the image beam in the vertical dimension by oscillating at a vertical frequency other than the vertical resonant frequency.

11. A method, comprising:

Sweeping an image beam back and forth in the vertical dimension according to a vertical sinusoid having a phase; and sweeping the image beam back and fourth in a horizontal dimension according to a horizontal sinusoid, wherein the image beam is swept while the image beam is "on" from a first edge of an image to a second edge of the image continuously in a first direction of the horizontal dimension, and wherein the image beam is sweet while the image beam is "on," from the second edge of the image to the first edge of the image continuously in a second direction of the horizontal dimension, such that the image beam traverses a pattern that repeats every $n_v$ periods of the horizontal sinusoid, the vertical having a phase equal to $$-\frac{\pi}{2} + \frac{\pi}{n_v}\left[k + \frac{1}{2}\right]$$

when the phase of the horizontal sinusoid equals $$\pm \pi/2$$

and where k=0, 1, . . . ($2n_v$−1).

12. The method of claim 11 wherein:

sweeping the image beam in the vertical dimension comprises sinusoidally sweeping the image beam in the vertical dimension at a vertical frequency; and sweeping the image beam in the horizontal dimension comprises sinusoidally sweeping the image beam back and forth in the horizontal dimension at a horizontal frequency that is lower than the vertical frequency.

13. The method of claim 11 wherein sweeping the image beam back and forth in the horizontal dimension comprises sweeping the image beam along a path that is a function of a fundamental horizontal frequency and a harmonic of the fundamental horizontal frequency.

14. The method of claim 11 wherein the horizontal dimension is substantially orthogonal to the vertical dimension.

15. The method of claim 11, wherein sweeping the image beam in the vertical dimension comprises sweeping the image beam bi-directionally in the vertical dimension.

16. The method of claim 11, further comprising:

a first reflector sweeping the image beam in the horizontal dimension; and a second reflector sweeping the image beam in the vertical dimension.

17. The method of claim 11, further comprising a single reflector simultaneously sweeping the image beam in the horizontal dimension and the vertical dimension.

18. The method of claim 11 further comprising:

sweeping the image beam in the horizontal dimension by resonating at a horizontal frequency; and sweeping the image beam in the vertical dimension by resonating at a vertical frequency.

19. The method of claim 11 having horizontal and vertical resonant frequencies and further comprising sweeping the image beam in the vertical dimension by resonating at the vertical frequency; and sweeping the image beam in the horizontal dimension by oscillating at a horizontal frequency other than the horizontal resonant frequency.

20. An image generator comprising:

a scan assembly operable to:

Sweep an image beam in a horizontal dimension according to a horizontal sinusoid having a phase; and sweeping the image beam back and fourth in a vertical dimension according to a vertical sinusoid, wherein the image beam is swept while the image beam is "on" from a first edge of an image to a second edge of the image continuously in a first direction of the vertical dimension, and wherein the image beam is swept while the image beam is "on," from the second edge of the image to the first edge of the image continuously in a second direction of the vertical dimension, such that the image beam traverses a pattern that repeats every $n_h$ periods of the horizontal sinusoid, the vertical having a phase equal to $$-\frac{\pi}{2} + \frac{\pi}{n_h}\left[k + \frac{1}{2}\right]$$

when the phase of the horizontal sinusoid equals $$\pm \frac{\pi}{2}$$

and where k=0, 1, . . . ($2n_h$−1).

21. An image generator comprising:

a scan assembly operable to:

Sweep an image beam back and forth in the vertical dimension according to a vertical sinusoid having a phase; and sweeping the image beam back and fourth in a horizontal dimension according to a horizontal sinusoid, wherein the image beam is swept while the image beam is "on" from a first edge of an image to a second edge of the image continuously in a first direction of the horizontal dimension, and wherein the image beam is sweet while the image beam is "on," from the second edge of the image to the first edge of the image continuously in a second direction of the horizontal dimension, such that the image beam traverses a pattern that repeats every $n_v$ periods of the horizontal sinusoid, the vertical having a phase equal to $$-\frac{\pi}{2} + \frac{\pi}{n_v}\left[k + \frac{1}{2}\right]$$

when the phase of the horizontal sinusoid equals $$\pm \pi/2$$

and where k=0, 1, . . . ($2n_v$−1).

* * * * *